United States Patent
Sujan et al.

(10) Patent No.: US 10,093,299 B2
(45) Date of Patent: Oct. 9, 2018

(54) ROUTE-VEHICLE ROAD LOAD MANAGEMENT AND/OR OPERATOR NOTIFICATION THEREOF

(71) Applicant: Cummins Inc., Columbus, IN (US)

(72) Inventors: Vivek Anand Sujan, Columbus, IN (US); Phani Vajapeyazula, Columbus, IN (US); Kenneth Follen, Greenwood, IN (US); An Wu, Columbus, IN (US); Barty L. Moffett, Seymour, IN (US); Howard Robert Frost, Columbus, IN (US); Suk-Min Moon, Greenwood, IN (US); Jaidev Khatri, Jaipur (IN); Wesley M. Mays, Coppell, TX (US)

(73) Assignee: Cummins Inc., Columbus, IN (US)

( * ) Notice: Subject to any disclaimer, the term of this patent is extended or adjusted under 35 U.S.C. 154(b) by 141 days.

(21) Appl. No.: 14/625,951

(22) Filed: Feb. 19, 2015

(65) Prior Publication Data

US 2015/0239454 A1 Aug. 27, 2015

Related U.S. Application Data

(60) Provisional application No. 61/941,850, filed on Feb. 19, 2014.

(51) Int. Cl.
| | |
|---|---|
| *B60W 10/06* | (2006.01) |
| *B60W 10/10* | (2012.01) |
| *F02D 41/14* | (2006.01) |
| *G01C 21/34* | (2006.01) |
| *F02D 29/02* | (2006.01) |
| *F02D 41/22* | (2006.01) |

(52) U.S. Cl.
CPC .......... *B60W 10/06* (2013.01); *B60W 10/10* (2013.01); *F02D 29/02* (2013.01); *F02D 41/1401* (2013.01); *G01C 21/3469* (2013.01); *B60W 2510/06* (2013.01); *B60W 2520/00* (2013.01); *B60W 2540/00* (2013.01); *B60W 2550/12* (2013.01); *B60W 2550/14* (2013.01); *B60W 2710/06* (2013.01); *B60W 2710/10* (2013.01); *F02D 2041/142* (2013.01); *F02D 2041/228* (2013.01); *F02D 2200/0625* (2013.01); *F02D 2200/604* (2013.01); *F02D 2200/702* (2013.01)

(58) Field of Classification Search
CPC .... B60W 10/06; B60W 10/10; F02D 41/1402
See application file for complete search history.

(56) References Cited

U.S. PATENT DOCUMENTS

| | | |
|---|---|---|
| 5,832,400 A | 11/1998 | Takahashi et al. |
| 5,839,534 A | 11/1998 | Chakraborty et al. |
| 5,995,895 A | 11/1999 | Watt et al. |
| 6,128,570 A | 10/2000 | Akhteruzzaman |

(Continued)

FOREIGN PATENT DOCUMENTS

WO 2008094114 A1 8/2008

*Primary Examiner* — Justin Holmes
*Assistant Examiner* — David Morris
(74) *Attorney, Agent, or Firm* — Taft Stettinius & Hollister LLP

(57) ABSTRACT

A vehicle may include a controller configured to control the vehicle to operate in an active control mode or a passive control mode. In the passive control mode, the controller may provide a feedback indicator on a human machine interface. In the active control mode, the controller may provide a control command to an engine control unit.

38 Claims, 9 Drawing Sheets

(56) References Cited

U.S. PATENT DOCUMENTS

| | | |
|---|---|---|
| 6,278,928 B1 | 8/2001 | Aruga et al. |
| 6,363,310 B1 | 3/2002 | Schuplin et al. |
| 6,374,173 B1 | 4/2002 | Ehlbeck |
| 6,847,887 B1 | 1/2005 | Casino |
| 6,856,897 B1 | 2/2005 | Phuyal et al. |
| 7,072,762 B2 | 7/2006 | Minami et al. |
| 7,426,432 B2 | 9/2008 | Kawazoe et al. |
| 7,440,835 B2 | 10/2008 | Shima |
| 8,498,795 B2 | 7/2013 | Eriksson et al. |
| 8,498,809 B2 | 7/2013 | Bill |
| 2002/0138190 A1 | 9/2002 | Hellmann et al. |
| 2003/0109980 A1 | 6/2003 | Kojima et al. |
| 2004/0039517 A1* | 2/2004 | Biesinger ............ G08G 1/01 701/117 |
| 2004/0084237 A1 | 5/2004 | Petrie, Jr. |
| 2005/0027423 A1 | 2/2005 | Minami et al. |
| 2007/0192013 A1 | 8/2007 | Bando et al. |
| 2008/0091327 A1 | 4/2008 | Tsuchiya et al. |
| 2008/0319618 A1 | 12/2008 | Sjogren et al. |
| 2009/0164081 A1 | 6/2009 | Meloche et al. |
| 2009/0259354 A1 | 10/2009 | Krupadanam et al. |
| 2010/0030458 A1 | 2/2010 | Coughlin |
| 2010/0049400 A1 | 2/2010 | Duraiswamy et al. |
| 2011/0106388 A1 | 5/2011 | Boeckenhoff et al. |
| 2011/0160990 A1 | 6/2011 | Mineta |
| 2011/0166754 A1 | 7/2011 | Kolk et al. |
| 2011/0276216 A1 | 11/2011 | Vaughan |
| 2012/0022764 A1 | 1/2012 | Tang et al. |
| 2012/0123652 A1* | 5/2012 | Rockwood ............ B60W 10/06 701/54 |
| 2012/0197504 A1 | 8/2012 | Sujan et al. |
| 2012/0209505 A1 | 8/2012 | Breed et al. |
| 2013/0030668 A1 | 1/2013 | Eriksson et al. |
| 2013/0085651 A1 | 4/2013 | Johannsson et al. |
| 2014/0244129 A1 | 8/2014 | Filev et al. |
| 2014/0277835 A1 | 9/2014 | Filev et al. |
| 2015/0049913 A1 | 2/2015 | Zhong |

\* cited by examiner

ROUTE-VEHICLE ROAD LOAD MANAGEMENT AND/OR OPERATOR NOTIFICATION THEREOF

CROSS REFERENCE TO RELATED APPLICATIONS

The present application claims the benefit of U.S. Provisional Patent Application No. 61/941,850, filed on Feb. 19, 2014, which is hereby incorporated by reference in its entirety.

GOVERNMENT RIGHTS

The present invention was made with Government assistance from the U.S. Department of Energy (DOE) under contract No. DE-EE0003403. The U.S. Federal Government may have certain rights therein.

BACKGROUND

The present application generally relates to load management, and in particular relates to managing loads for an internal combustion engine and/or operator notification. In a vehicle with an internal combustion engine, engine efficiency may be impacted in various ways, which may result in efficiency and/or optimization issues. Therefore, a need remains for further improvements in systems and methods in this area.

SUMMARY

One embodiment is a unique system and method for load management and/or operator notification. Other embodiments include apparatuses, systems, devices, hardware, methods, and combinations for managing loads of a vehicle and/or operator notification. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE FIGURES

The description herein makes reference to the accompanying figures wherein like reference numerals refer to like parts throughout the several views, and wherein.

DETAILED DESCRIPTION OF EXEMPLARY EMBODIMENTS

Figure 1:
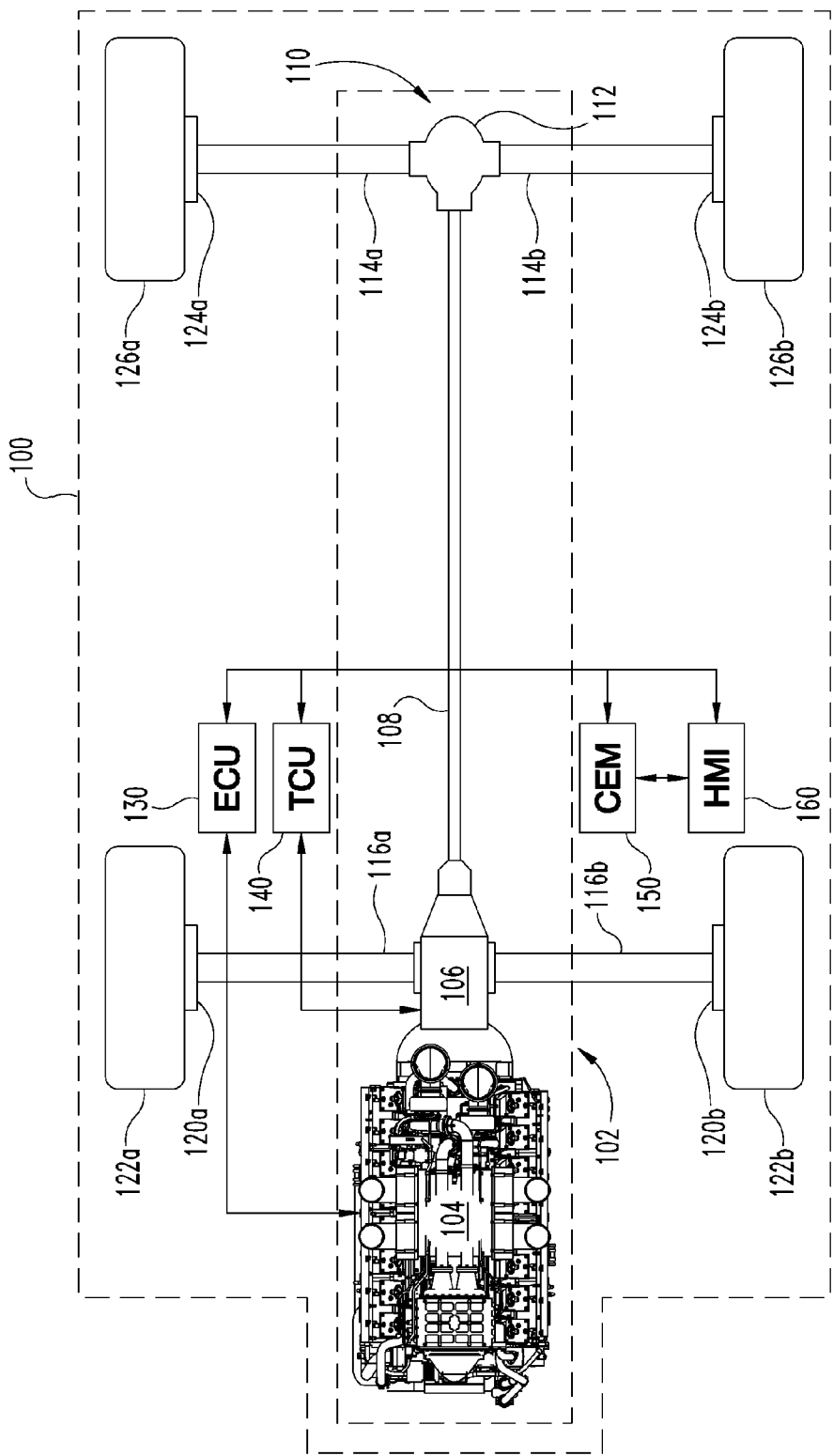
FIG. 1 is a schematic block diagram of an exemplary vehicle system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an exemplary vehicle system 100 including a powertrain 102 incorporated within vehicle system 100. In the illustrated embodiment, the powertrain 102 includes an engine 104, such as an internal combustion engine, structured to generate power for the vehicle system 100. The powertrain 102 further includes a transmission 106 connected to the engine 104 for adapting the output torque of the engine 104 and transmitting the output torque to a drive shaft 108. In certain embodiments, the transmission 106 may be connected to an engine crankshaft via a torque converter, a flywheel, a gearbox, and/or a clutch, which are not shown to preserve clarity.

In the rear wheel drive configuration illustrated in vehicle system 100, the powertrain 102 includes a final drive 110 having a rear differential 112 connecting the drive shaft 108 to rear axles 114a, 114b. It is contemplated that the components of powertrain 102 may be positioned in different locations throughout the vehicle system 100. In one non-limiting example of a vehicle system 100 having a front wheel drive configuration, transmission 106 may be a transaxle and final drive 110 may reside at the front of the vehicle system 100, connecting front axles 116a and 116b to the engine 104 via the transaxle. It is also contemplated that in some embodiments the vehicle system 100 is in an all-wheel drive configuration.

Vehicle system 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle system 100, which is directed to the regulation and control of transmission 106 operation. ECU 130 and TCU 140 are each in electrical communication with a plurality of vehicle sensors (not shown) in vehicle system 100 for receiving and transmitting conditions of vehicle system 100, such as temperature and pressure conditions, for example. In certain embodiments, the ECU 130 and the TCU 140 may be combined into a single control module, commonly referred to as a powertrain control module (PCM) or powertrain control unit (PCU), or the like. It is contemplated that ECU 130 and/or TCU 140 may be integrated within the engine 104 or transmission 106, respectively. Other various electronic control units for vehicle subsystems are typically present in vehicle system 100, such as a braking system electronic control unit and a cruise control electronic control unit, for example, but such other various electronic control units are not show in vehicle system 100 to preserve clarity.

Vehicle system 100 further includes a cycle efficiency management (CEM) module 150, which may be directed to the control of the operations described herein and/or directed toward an intermediary control for the regulation and control of the powertrain 102 in vehicle system 100. In the illustrated embodiment, CEM module 150 is in electrical communication with each of the ECU 130 and TCU 140. In certain embodiments, at least a portion of the CEM module 150 may be integrated within the ECU 130 and/or TCU 140. CEM module 150 may further be in electrical communication with one or more of the plurality of vehicle sensors in vehicle system 100 for receiving and transmitting conditions of vehicle system 100, such as temperature and pressure conditions, for example. It is contemplated that at least a portion of the conditions and/or measured inputs used for interpreting signals by the CEM module 150 may be received from ECU 130 and/or TCU 140, in addition to or alternatively to the plurality of vehicle sensors. Furthermore, the CEM module 150 may include a processor or controller and be a control unit.

In certain embodiments, any or all of the ECU 130, TCU 140, and CEM module 150 may be electronically communicatively coupled to a human-machine interface (HMI) 160, also commonly referred to as a man-machine interface (MMI), a human-computer interaction (HCI), an operator interface console (OIC) or terminal (OIT), or the like. The HMI 160 provides an interface for a human-machine interaction between an operator and one or more input, output, or combination peripheral interface devices (not shown). Example input peripheral interface devices include a sensor, a button, a microphone, a keyboard, a track pad, and a mouse. Examples of output peripheral interface devices include a display monitor, an indicator light, a printer, and a speaker. An example of a combination peripheral interface device includes a display monitor with touchscreen capability.

In the preferred embodiment, HMI 160 interprets signals from each of ECU 130, TCU 140, and CEM module 150 and displays them to the operator on the one or more output peripheral interface devices, generally via a graphical user interface (GUI), which provide graphical representations of the interpreted signals in a user readable form. In certain embodiments, the one or more input peripheral interface devices receive operator generated commands and transmit the commands to the HMI 160, where the HMI interprets the commands and relays signals to ECU 130, TCU 140, and/or CEM module 150. Certain embodiments of the graphical representations displayed via the GUI are discussed in further detail below. Other means of representing the interpreted signals to the operator in addition to or alternatively to the GUI are contemplated, such as via one or more indicator lights, tactile feedback, and/or audible sounds.

In the illustrated embodiment, vehicle system 100 includes two front brakes 120a, 120b each positioned between and operably connected to two front wheels 122a, 122b and front axles 116a, 116b, respectively. Vehicle system 100 further includes two rear brakes 124a, 124b each positioned between two rear wheels 126a, 126b and rear axles 114a, 114b, respectively. It is contemplated that vehicle system 100 may have more or fewer tires and brakes than illustrated in FIG. 1. Vehicle system 100 may also include various components not shown, such as a fuel system including a fuel tank, a front differential, a braking system, a suspension, an engine intake system and an exhaust system, which may include an exhaust aftertreatment system, to name a few examples.

The CEM module 150 includes stored data values, constants, and functions, as well as operating instructions stored on, for example, a computer readable medium. Any of the operations of exemplary procedures described herein may be performed at least partially by the CEM module 150. In certain embodiments, the controller includes one or more modules structured to functionally execute the operations of the controller. The description herein including modules emphasizes the structural independence of the aspects of the CEM module 150, and illustrates one grouping of operations and responsibilities of the CEM module 150. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2. Operations illustrated are understood to be exemplary only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
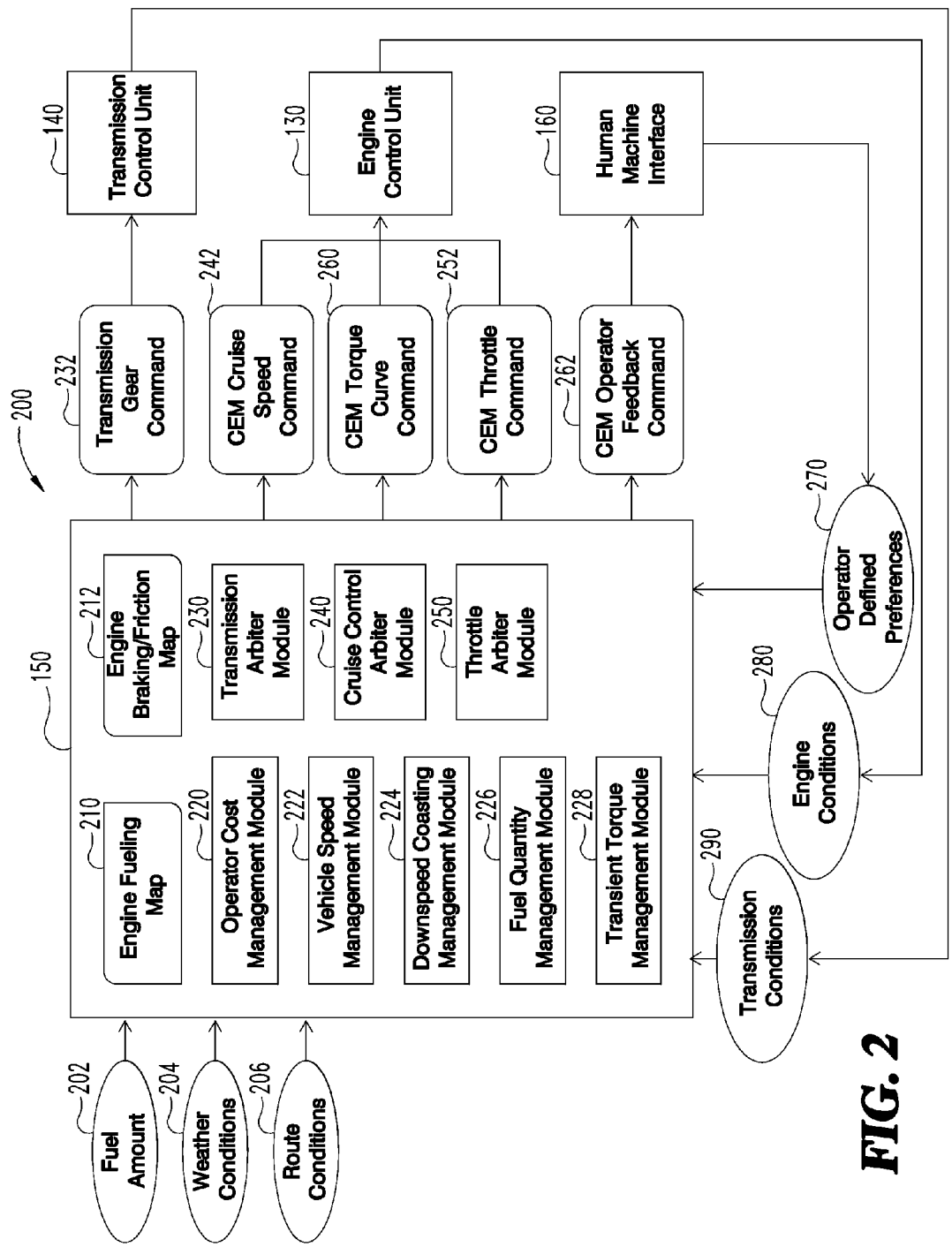
FIG. 2 is a schematic block diagram of an exemplary cycle efficiency management module.

One exemplary embodiment of CEM module 150 is shown in FIG. 2. The CEM module 150 may include an engine fueling map 210, an engine braking/friction map 212, an operator cost management (OCM) module 220, a vehicle speed management (VSM) module 222, a downspeed coasting management (DCM) module 224, a fuel quantity management (FQM) module 226, a transient torque management (TTM) module 228, a transmission arbiter module 230, a cruise control arbiter module 240, and a throttle arbiter module 250. Other arrangements that functionally execute the operations of the CEM module 150 are contemplated in the present application.

In certain embodiments, the CEM module 150 includes a fuel amount input 202, a weather conditions input 204 from one or more sensors and/or one or more external devices for detecting weather conditions, and a route conditions input 206 from one or more sensors and/or one or more external devices for detecting route conditions. Fuel amount 202 may include the amount of fuel remaining in the fuel tank. Weather conditions 204 may include a humidity level, a wind condition, and a precipitation condition. Route conditions 206 may include a trip distance, an elevation profile, a route grade profile, a maximum speed limit, a minimum speed limit, a traffic condition, and a road condition.

In the illustrated embodiment, CEM module 150 includes an operator defined preferences 270 input from the HMI 160. Operator defined parameters 270 may be input by the operator using the one or more input/combination peripheral interface devices connected to HMI 160.

Operator defined parameters 270 may include an operator cost, a fuel cost, a trip time, a trip time factor, a coasting factor, a cruise control speed setting, a requested speed, a throttle gear setting, a speed limit excursion, an engine torque curve variation factor, and a number of refueling stops. Additional operator defined parameters 270 may include a fuel quantity buffer input, an allowable upper speed limit variance, an allowable lower speed limit variance, and a request route message. Further operator defined parameters 270 may include an enabled state for each operation control module 220, 222, 224, 226, 228. The enabled state may be toggled by the operator using the one or more input peripheral interface devices connected to HMI 160, or by a physical switch, for example. Operator defined parameters 270 may be input by the operator at the start of the vehicle route. In certain embodiments, on or more of the operator defined parameters 270 may be adjustable at any point along the vehicle route.

The operator cost is the vehicle operator income cost entered by the operator as a monetary unit cost per gallon. The fuel cost is the current fuel cost along the vehicle route in a monetary unit cost per gallon. In certain embodiments, an average fuel cost along a travel route may be used. The trip time factor is a multiplicative speed factor that increases the trip time. Starting with a minimum trip time, which is generally defined by speed limits, the operator selects the trip time factor from an allowable trip time factor range. The trip time factor, which may correlate to an operator's urgency to complete the vehicle route, will allow for fuel economy to be altered (e.g., a slower trip time factor generally results in better fuel economy). The coasting factor adjusts the amount of coast down distance, changing a pre-calibrated vehicle coasting distance.

The engine torque curve variation factor indicates the allowable torque curve variation. An active torque curve variation limits engine torque based on upcoming travel route terrain conditions. A low engine torque curve variation factor indicates that the engine will remain relatively close to the original torque curve. A high engine torque curve variation factor allows a reduction in engine torque curve to limit torque requests, either by the operator or the cruise control, through terrain and/or vehicle speed variations.

The number of refueling stops indicates the number of acceptable refueling stops under anticipated conditions. The fuel quantity buffer input allows the operator to override a calculated minimum amount of fuel to maintain in the fuel tank.

The allowable upper and lower speed limit variances are a percentage of the current cruise set point that the operator is willing to allow the vehicle to vary by. Each variance is used by VSM module 222 to determine a vehicle velocity profile for the travel route.

It is contemplated that the inputs may be received from a source other than from the operator to the HMI 160 via the one or more input interface devices. In certain embodiments, HMI 160 may be additionally or alternatively connected via a wireless data transfer method, such as a Wi-Fi connection, a 3G/4G data connection, Bluetooth, or other similar method of wireless data transfer allowing a remote user to enter one or more of the operator defined parameters 270.

In the illustrated embodiment in FIG. 2, CEM module 150 includes a CEM operator feedback command 262 which includes one or more outputs that are provided to HMI 160 for update/display, generally via the GUI. The one or more outputs contained in the CEM operator feedback command 262 may include an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill. CEM operator feedback command 262 may be provided to the operator at the start of the vehicle route. In certain embodiments, one or more CEM operator feedback commands 262 may be updated/provided at any point along the vehicle route and may be provided in real time.

The instantaneous fuel economy and instantaneous operator income outputs may be based on recent historical data. The operator income selection and fuel economy selection outputs may be based on the trip time factor. The current engine torque curve output provides a real time display of the current engine torque curve. If the operator has input the engine torque curve variation factor, the current engine torque curve output will display both the engine torque curve and the max deviation of the engine torque curve.

The fuel quantity buffer output is an internal computation of a minimum amount of fuel to be maintained in the fuel tank based on factors including a maximum distance between fuel stops, traffic conditions, and/or weather conditions. The fuel quantity buffer output may be displayed according to operator preference in units of gallons, distance, or to time until empty.

The freight efficiency increase is based on the number of refueling stops and presents the operator with the freight efficiency increase as a percentage of baseline load or as a total number of pounds. The initial fuel quantity is based on the number of refueling stops and presents the operator with the initial volume of fuel required in the fuel tank.

The cruise speed set point, gear set point, and throttle set point outputs are each forward looking profiles used by the one or more output peripherals of HMI 160 to inform the operator as to the upcoming and/or recommended changes to each set point. The refueling stop location output is a forward looking profile used by the one or more output peripherals of HMI 160 to inform the operator of one or more upcoming fuel stops, as well as a next fuel stop.

The fuel quantity to refill output is an amount of fuel to refill at the indicated refueling stop. The available fuel quantity output is an amount of fuel that is available until the fuel tank will become empty and may be displayed in units of distance, quantity, or time. In certain embodiments the available fuel quantity output display units may be based on the fuel quantity buffer display input selection. The distance to refill output is the distance to the next refueling station for the operator to refill the fuel quantity to refill output.

The CEM module 150 illustrated in FIG. 2 includes engine control conditions 280 input from the ECU 130 and transmission control conditions 290 input from the TCU 140. In certain embodiments, the engine control conditions 280 and transmission control conditions 290 may be determined from a plurality of sensors positioned throughout vehicle system 100. Engine control conditions 280 may include a brake actuation parameter, a throttle position parameter, a torque request parameter, an ambient air pressure, an ambient air temperature, an engine temperature, an engine torque, an engine degrade state, and a brake position. Transmission control conditions 290 may include a transmission gear ratio, a current transmission gear, a final drive ratio, a neutral gear state, a transmission shift schedule, and a shift solenoid condition.

In operation, CEM module 150 is a tool based on a series of operation control modules, such as OCM module 220, VSM module 222, DCM module 224, FQM module 226, and TTM module 228, that provide the operator with both anticipated and currently desired vehicle system 100 operation behavior to optimize fuel economy. The series of operation control modules are focused on the components of vehicle system 100, and more specifically the components of powertrain 102. The states of vehicle system 100 and recommendations generated by the operation control modules may be displayed to the operator via the HMI 160 GUI. The operator can enable and disable each of the modules contained within the CEM module 150 by performing an interaction with the one or more input peripheral interface devices, or the one or more combination peripheral interface devices, connected to the HMI 160. For a given travel route and one or more route constraints, the recommendations made by the CEM module 150 is dependent on the set of operation control modules that have been enabled to be active within the CEM module 150. The CEM module 150 architecture is such that when a particular combination of operation control modules are enabled, priorities and conflicts amongst the operation control modules are resolved internal to CEM module 150 to provide the recommendation to the operator, or directly to the ECU 130 and/or TCU 140, at any point along the travel route.

CEM module 150 is operable in two control modes: an active control mode and a passive control, or manual, mode. In an exemplary embodiment, the CEM module is operable in both active and passive control modes. In active control mode, the CEM module 150 assumes active control of the vehicle system 100, regulating a vehicle speed, the transmission gear, the engine torque curve, and/or other powertrain 102 operating conditions to ensure optimal vehicle system 100 operation. In passive control mode, the CEM module 150 displays to the operator one or more recommended powertrain 102 operating conditions, via HMI 160, to notify the operator of vehicle system 100 that changes can be made to achieve optimal vehicle system 100 operation.

CEM module 150 may be configured to monitor inputs from various sensors and devices such that CEM module 150 can monitor route, weather, and traffic conditions, or an operator request, to determine whether to switch between active and passive control. Certain conditions where switching from active to passive control include detecting a braking activity, a severe weather condition, such as sleet or heavy winds, a severe traffic condition, such as heavy congestion resulting in a decrease of achievable vehicle speeds, a diagnostic indicating an engine derate event, and a drop in speed limits.

CEM module 150 further includes the engine fueling map 210 and the engine braking/friction map 212, which may be in the form of multidimensional performance maps, or lookup tables, calibrated offline and provided by the engine manufacturer. It is contemplated that in certain embodiments the engine fueling map 210 may be obtained from the engine braking/friction map 212.

The OCM module 220 may receive and interpret at least one of the operator cost, the fuel cost, the transmission shift schedule, an engine fueling map output, the trip time, the trip time factor, the elevation profile, and the route grade profile as inputs. OCM module 220 is directed toward optimizing cruise speed control for the best net income for the operator based on the inputs. The OCM module 220 is further directed toward determining the vehicle velocity profile, by using a velocity as a function of a distance, for example. The OCM module 220 is typically only operational when the vehicle cruise control is active. Further, the OCM module 220 outputs a maximum cruise speed reduction from speed limit value to the operator, via the one or more output peripheral interface devices of HMI 160, for example, to notify the operator of how much the cruise speed will drop below the speed limit over the travel route based on the trip time factor. The maximum cruise speed reduction from speed limit value may be updated at the start of the vehicle route. In certain embodiments, the maximum cruise speed reduction from speed limit may be updated in real time at any point throughout the travel route.

The VSM module 222 may receive and interpret the trip distance, the elevation profile, and at least one of the trip time, the trip time factor, the transmission shift schedule, the engine fueling map output, the route grade profile, the transmission gear ratio, and a drivetrain efficiency as inputs. The drivetrain efficiency may be measured from the power input and power output for a drivetrain of vehicle system 100, where the drivetrain includes components of the powertrain 102 of vehicle system 100 excluding the engine 104 and the transmission 106. VSM module 222 is directed toward optimizing cruise speed control based on a vehicle velocity profile to minimize fuel consumption given the inputs. The VSM module 222 is further directed toward determining a transmission gear profile. Like the OCM module 220, the VSM module 222 is typically only active when the vehicle cruise control is active.

The DCM module 224 may receive and interpret an engine friction map output, the transmission gear ratio, the drivetrain efficiency, the elevation profile, and the route grade profile as inputs. DCM module 224 is directed toward achieving optimal fuel economy on speed limit changes by providing a transmission gear recommendation while defueling to coast down to a target speed given the inputs. The DCM module 224 is further directed toward determining a transmission gear profile and an engine throttle profile.

The FQM module 226 may receive and interpret the number of refueling stops, the engine fuelling map output, the transmission gear ratio, the current transmission gear, the drivetrain efficiency, the elevation profile, and the route grade profile as inputs. FQM module 226 is directed toward a fuel quantity and a refueling strategy by providing a recommendation of both a refueling quantity and a refueling location, given the inputs.

The TTM module 228 may receive and interpret the engine fuelling map output, the transmission gear ratio, the drivetrain efficiency, the elevation profile, and the route grade profile as inputs. TTM module 228 is directed toward optimizing fuel economy by managing a torque capability of engine 104 to mitigate transient torque excursions and excessive vehicle speeds beyond vehicle control set points, such as cruise control, for example, given the inputs. The TTM module 228 is further directed toward determining a torque curve.

In the illustrated embodiment, the CEM module 150 includes a transmission arbitration module 230, a cruise control arbitration module 240, and a throttle arbitration module 250. Each arbitration module 230, 240, 250 produces a recommended output depending on whether the CEM module 150 is operating under active or passive control, given the inputs.

In one exemplary embodiment, the OCM module 220 receives and interprets the desired trip time and outputs an OCM vehicle speed value and an OCM trip time value. The VSM module 222 receives and interprets the desired trip time and the OCM trip time value, and outputs a VSM transmission gear command, a VSM vehicle speed value, and a VSM throttle value. The DCM module 224 receives and interprets the OCM vehicle speed value and the VSM vehicle speed value, and outputs a DCM transmission gear command and a DCM throttle value. The FQM module 226 receives and interprets the OCM vehicle speed value and the VSM vehicle speed value, and outputs the CEM operator feedback command 262 to the HMI 160. The TTM module 228 receives and interprets the OCM vehicle speed value and the VSM vehicle speed value, and outputs a CEM torque curve command 260 to the ECU 130. The transmission arbitration module 230 receives and interprets the DCM transmission gear command and the VSM transmission gear command, and outputs a CEM transmission gear command 232 to the TCU 140. The cruise control arbitration module 240 receives and interprets the OCM vehicle speed value and the VSM vehicle speed value, and outputs a CEM cruise speed command 242 to the ECU 130. The throttle control arbitration module 250 receives and interprets DCM throttle value and the VSM throttle value, and outputs a CEM throttle command 252 to the ECU 130.

In certain embodiments, the CEM module 150 includes a thermal management (TM) module (not shown) which is directed toward managing an optimal efficiency tradeoff during engine 104, transmission 106, and exhaust aftertreatment system warm-up. The TM module receives and interprets the trip time, the trip time factor, the transmission gear ratio, the current transmission gear, the engine temperature, the engine fueling map output, the elevation profile, and the route grade profile.

Figure 3:
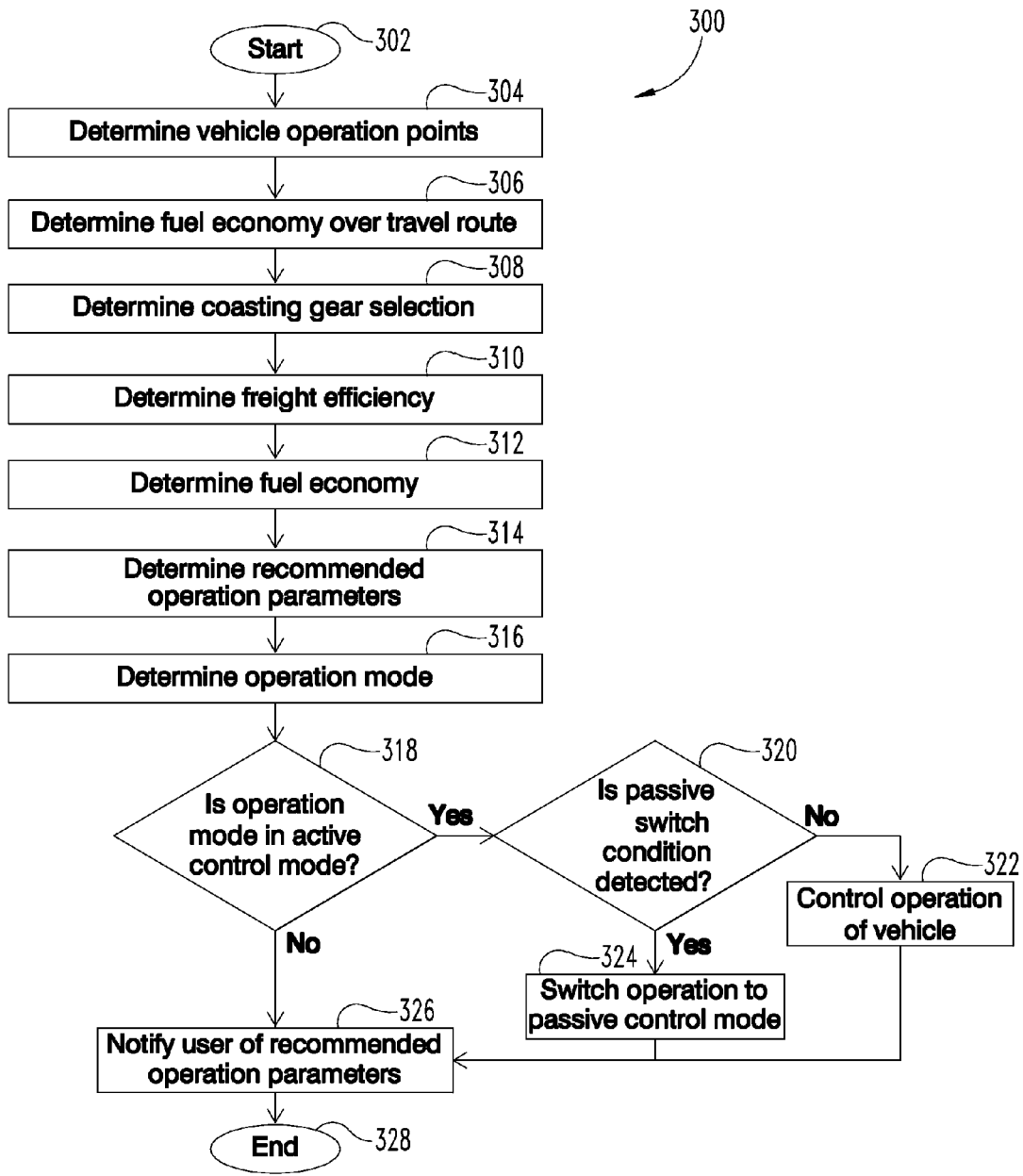
FIG. 3 is a schematic flow diagram of an exemplary process for providing a set of recommendations to improve fuel economy and freight efficiency for a vehicle along the travel route.

The schematic flow diagram in FIG. 3 and related description which follows provides an illustrative embodiment of performing exemplary procedures for providing a set of recommendations to improve fuel economy and freight efficiency for a vehicle along the travel route. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of an exemplary procedure 300 for providing a set of recommendations to improve fuel economy and freight efficiency for a vehicle along the travel route that is put into operation by programming the CEM module 150 for use in, for example, vehicle system 100. Procedure 300 begins at operation 302, in which a control routine for providing the set of recommendations to CEM module 150 to improve fuel economy and freight efficiency is started. Operation 302 may begin by interpreting a key-on event, completion of a cycle, restarting procedure 300, and/or by initiation by the operator or a technician.

Procedure 300 continues to operation 304, where vehicle operation points, such as the trip time and route, traffic, and weather conditions, are determined. From operation 304, procedure 300 proceeds to operation 306 to determine an optimal fuel economy along the vehicle route given the vehicle operation points. Procedure 300 continues to operation 308 to determine an optimal coasting gear selection based on a desired coasting profile.

From operation 308, procedure 300 proceeds to operation 310, where an optimal freight efficiency is determined subject to the number of refueling stops. Procedure 300 continues to operation 312 to determine an optimal fuel economy subject to a desired transient response from the vehicle and the trip time. Procedure 300 proceeds to operation 314 to determine a set of recommended operation parameters based on the freight efficiency and fuel economy.

Procedure 300 continues to operation 316 to determine the operation mode, either active control mode or passive control mode. From operation 316, procedure 300 continues to conditional 318 to determine whether the operation mode is in active control mode. If conditional 318 is positive, then procedure 300 continues to conditional 320 to determine whether a passive switch condition is detected such that it is dangerous to the operator to remain in active control mode; otherwise, if conditional 318 is negative, procedure 300 continues to operation 326 describe in further detail below.

If conditional 320 is negative, procedure 300 proceeds to operation 322 to control the operation of the vehicle based on the set of recommended operation parameters. If conditional 320 is positive, procedure 300 continues to operation 324 where the operation mode is switched to passive control mode from active control mode, returning control of the vehicle to the operator. Both procedure 322 and procedure 324 continue to procedure 326 to notify the operator of the recommended operation parameters. Procedure 300 is complete and ends at operation 328.

Each of the operation control modules 220, 222, 224, 226, 228 will have a state and a state indicator. In one embodiment, each of the operation control modules 220, 222, 224, 226, 228 has a disabled, idle, and enabled state. It is contemplated that the corresponding light indicator may have any number of states. In certain embodiments, the state indicator may be a corresponding indicator light that may be a graphical representation displayed in a GUI, or additionally and/or alternatively displayed via a light emitting source, such as a light-emitting diode, lamp, or bulb. In certain embodiments, each state may have its own color represented by the light indicator. In one such example embodiment, disabled may be gray, idle may be red, and enabled may be green.

Each state of the operation control modules 220, 222, 224, 226, 228 may be defined by one or more variables, which may be of any data type. It is contemplated that each of the one or more variables may be used alone, or in combination with other variables, to determine the state of each operation control module 220, 222, 224, 226, 228.

OCM module 220 may have three states: 1) OCM disable; 2) OCM idle; and 3) OCM enable. When OCM module 220 is in OCM disable state, variable C_OCM_Disable is equal to 1 and C_Writing_CC_Enable is equal to zero. When in VSM idle state, variable C_OCM_Idle is equal to one and C_Writing_CC_Enable is equal to zero. When the VSM enable state is active, variable C_OCM_Enable is equal to one, C_Writing_CC_Enable is equal to one, and C_CC_Final_Value is equal to OCM_Cruise_Speed.

VSM module 222 may have three states: 1) VSM disable; 2) VSM idle; and 3) VSM enable. When VSM module 222 is in VSM disable state, variable C_VSM_Disable is equal to one and C_Writing_CC_Enable is equal to zero. When in VSM idle state, variable C_VSM_Idle is equal to one and C_Writing_CC_Enable is equal to zero. When the VSM enable state is active, variable C_VSM_Enable is equal to one, C_Writing_CC_Enable is equal to one, and C_CC_Final_Value is equal to VSM_Cruise_Speed.

DCM module 224 may have five states: 1) No action on DCM disable; 2) CC enable DCM disable; 3) No action on CC DCM idle; 4) CC enable DCM idle; and 5) DCM enable. When DCM module 224 is in the "No action on DCM disable" state, no action is taken on the cruise control status and variable C_DCM_Disable is equal to one, C_DCM_Final_Gear_Enable is equal to zero, and C_Change_Cruise_Enable is equal to zero. When in the "CC enable DCM disable" state, the cruise control is enabled and C_CC_Final_Value is equal to DCM_Cruise_Speed, C_DCM_Disable is equal to one, C_DCM_Final_Gear_Enable is equal to zero, and C_Change_Cruise_Enable is equal to zero. When the "No action on CC DCM idle status" is active, no action is taken on the cruise control status and variable C_DCM_Idle is equal to one, C_DCM_Final_Gear_Enable is equal to zero, and C_Change_Cruise_Enable is equal to zero. In the "CC enable DCM idle" state, the cruise control is enabled and variable C_CC_Final_Value is equal to DCM_Cruise_Speed, C_DCM_Idle is equal to one, C_DCM_Final_Gear_Enable is equal to zero, and C_Change_Cruise_Enable is equal to zero. When the DCM enable state is active, variable C_DCM_Enable is equal to one, C_DCM_Final_Gear_Enable is equal to one, and C_Change_Cruise_Enable is equal to one.

FQM module 226 may have three states: 1) FQM disable; 2) FQM idle; and 3) FQM enable. When FQM module 226 is in the FQM disable state, which may indicate neither FQM offline nor FQM online are working, variable C_FQM_Disable is equal to one. In the FQM idle state, which may indicate that either FQM offline or FQM online are not working, variable C_FQM_Idle is equal to one. When in FQM enable state, which may indicate both FQM offline and FQM online are working, variable C_FQM_Enable is equal to one.

TTM module 228 may have three states: 1) TTM disable; 2) TTM idle; and 3) TTM enable. When TTM module 228 is in the TTM disable state, variable C_TTM_Disable is equal to one and C_TrqCv_Select Enable is equal to zero. In the TTM idle state, variable C_TTM_Idle is equal to one and AIP_SAT_Switch_Ovrd_Val is equal to one. When in the TTM enable state, variable C_TTM_Enable is equal to one and AIP_SAT_Switch_Ovrd_Val is equal to two.

As noted above, OCM module 220, VSM module 222, and DCM module 224 each set variable C_CC_Final_Value equal to their respective cruise speed, if the respective module is enabled. In certain embodiments, a speed setting priority exists such that VSM module 222 has a higher priority than both OCM module 220 and DCM module 224, and DCM module 224 has a lower priority than OCM module 220 and VSM module 222. For example, if all three operation control modules 220, 222, and 224 are enabled, the final result of variable C_CC_Final_Value would be set to VSM_Cruise_Speed.

The operator can enable and disable each of operation control modules 220, 222, 224, 226, 228 individually via software switches or as a whole by turning a physical switch, such as a dSPACE keyswitch, for example, which enables or disables the CEM module 150 altogether. Additionally and/or alternatively to the switches, a set of conditions may exist where one or more of the operation control modules 220, 222, 224, 226, 228 will be automatically enabled or disabled, depending on the set of conditions.

Each of OCM module 220, VSM module 222, DCM module 224, and FQM module 226 are not operable when disabled. When each of OCM module 220 and VSM module 222 are enabled, each writes their respective cruise speed setting, and each stops writing as soon as the respective module is disabled. If OCM module 220 and/or VSM module 222 are in an enabled state and a change occurs such that each of OCM module 220 and VSM module 222 are set to a disabled or idle state, the cruise control speed will be set to the original cruise control speed set by the operator. In certain embodiments, if OCM module 220 and/or VSM module 222 are in an enabled state and a change occurs such that both OCM module 220 and VSM module 222 are set to a disabled or idle state, the cruise control speed will be set to maintain a current vehicle speed.

DCM module 224 writes the transmission gear selection when enabled and stops writing when disabled. If DCM module 224 was not working at the time it was disabled, DCM module 224 just stops writing; however, if DCM module 224 was working prior to being disabled, the DCM module 224 sets the cruise control active to a CEM idle speed before it disables and stops writing the transmission gear selection. FQM module 226 only recommends the refueling location and amount when enabled. TTM module 228 chooses the original torque curve when disabled, and selects the torque curve when enabled. If enabled from a disabled state, each of the operation control modules 220, 222, 224, 226, 228 will return to their previous respective state.

Figure 4:
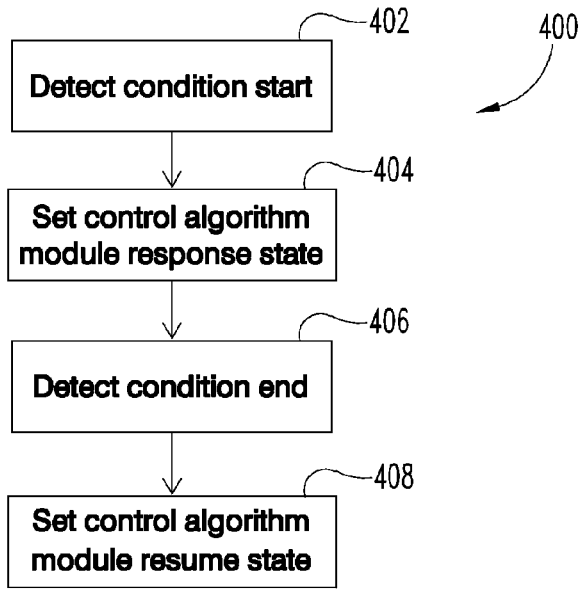
FIG. 4 is a schematic flow diagram of an exemplary process for state changes for one or more modules.

FIG. 4 illustrates a flow chart following the state changes of one or more operation control modules 220, 222, 224, 226, 228 in response to a condition that may trigger a switch from active control mode to passive control mode. Process 400 starts at operation 402 when a condition is detected that may trigger a state change for one or more operation control modules 220, 222, 224, 226, 228. In operation 404 a response state 404 is set for the one or more affected operation control modules 220, 222, 224, 226, 228. Process 400 continues to operation 406 upon detecting the condition has ended. In operation 408 the state of the one or more control modules 220, 222, 224, 226, 228 affected by the detected condition will change to a resume state.

One such condition includes the detection of operator induced events including an engine derate, a current speed limit being less than a low speed limit threshold, a throttle position being greater than or equal to a throttle position threshold, a throttle position rate being greater than or equal to a throttle position rate threshold, and variable CC_Status equal to zero, where the CC_Status variable was not set to zero by the DCM module 224, such as by CC_Cancel, CC_OnSwitch, and Brake event triggers. During each of the operator induced events, and the cruise control being active, OCM module 220 and VSM module 222 will become disabled, stop writing the cruise speed, and the cruise control speed will be set to CEM_Idle_Speed. OCM module 220 and VSM module 222 are typically only operational when the cruise control is active.

When the operator induced event ends, i.e. the brake pedal is released or cruise control is returned to an active state, OCM module 220 and VSM module 222 re-enable and resume writing the cruise speed. Generally, there are no actions for FQM module 226 to take when one of the operator induced events are detected, so FQM module 226 state remains unchanged.

A low speed limit would generally indicate the vehicle may be travelling in an area where the operator would likely need to assume control. In response to the current speed limit being less than the low speed limit threshold, such as 45 mph, for example, the DCM module will become disabled and, if the DCM module 224 is operational, DCM module 224 will stop writing the transmission gear selection. TTM module 228 also becomes disabled and chooses the original torque curve. When the current speed limit is greater than or equal to the low speed limit threshold, DCM module 224 is re-enabled and resumes writing the transmission gear selection, and TTM module 228 is re-enabled and resumes selecting the torque curve.

The operation control modules 220, 222, 224, 226, 228 allow an increase throttle request to take precedence in the event the operator requests more throttle under certain conditions, such as the throttle position being greater than or equal to the throttle position threshold and throttle position rate is greater than or equal to a throttle position rate threshold. The increase throttle request results in the DCM module 224, and TTM module 228 also being disabled. DCM module 224 stops writing the transmission gear selection, and TTM module 228 chooses the original torque curve. When the throttle request falls below the threshold condition that caused it, DCM module 224, and TTM module 228 are re-enabled. TTM module 228 resumes selecting the torque curve. When the throttle position is greater than or equal to the throttle position threshold, such as a threshold of 50% or 90%, for example, DCM module 224 will resume writing the transmission gear selection when the throttle position is less than the throttle position threshold. When the throttle position rate is greater than or equal to the throttle position rate threshold, such as 400% per second, for example, DCM module 224 will not resume writing the transmission gear selection when the throttle position rate is less than the throttle position rate threshold.

In addition to the operator induced events, certain event triggers, such as CC_Cancel, CC_OnSwitch, and Brake, may each be triggered by the operator, indicating the intention of the operator to take over control of vehicle system 100, or by the CEM module 150, indicating a condition exists such that the operator may need to assume control of vehicle system 100. Upon detecting an event trigger, DCM module 224 becomes disabled and stops writing the transmission gear selection, while TTM module 228 is also disabled and begins choosing the original torque curve. DCM module 224 re-enables and resumes writing the transmission gear selection. Additionally, TTM module 228 becomes enabled and resumes selecting the torque curve.

Another condition includes the detection of an engine derate or a transmission gear mismatch. For the duration of each condition, OCM module 220 and VSM module 222 will be disabled and stop writing the cruise speed. Modules 220, 222 typically will only resume writing the cruise speed upon the end of the condition that caused modules 220, 222 to become disabled. DCM module 224 will be disabled and stop writing the transmission gear selection for the duration of each condition, and will be re-enabled and resume writing the transmission gear selection when each condition ends. There is no action for FQM module 226 to take during either condition, so FQM module 226 state remains unchanged. TTM module 228 becomes disabled and chooses the original torque curve while either condition is ongoing, and when each condition concludes, TTM module 228 is re-enabled and resumes selecting the torque curve.

Another set of conditions that may trigger a switch from active control mode to passive control mode includes the detection of a vehicle speed event, which includes the difference between the vehicle speed and a CEM speed target being greater than an allowable speed difference, the vehicle speed being less than a low vehicle speed threshold, and the vehicle speed exceeding a posted speed limit. Such a trigger generally indicates that the operator requested the excess vehicle speed, so the operation control modules 220, 222, 224, 226, 228 should defer to the operator's request. When such a condition occurs, typically none of the control modules 220, 222, 224, 226, 228 will take any action as a result. Additionally, such a condition exists where the CC_Status variable was set to zero by the DCM module 224. In certain embodiments, when the cruise control is active and the difference between the vehicle speed and a CEM speed target is greater than an allowable speed difference, only OCM module 220 and VSM module 222 will become disabled and stop writing the cruise speed until the end of the condition, after which each will be re-enabled and resume writing the cruise speed. In other embodiments, when the vehicle speed is less than a low vehicle speed threshold, DCM module 224 will be disabled and stop writing the transmission gear selection until the end of the condition, after which the DCM module 224 will be enabled and resume writing the transmission gear selection upon the event ending.

Another event that may trigger a switch from active to passive control mode includes losing, or commonly referred to as dropping, a navigation and positioning device signal. While the navigation and positioning device signal is lost, each of OCM module 220 and VSM module 222 will be disabled and stop writing the cruise speed. Each module 220, 222 will be enabled and resume writing the cruise speed when the navigation and positioning device signal is no longer lost. DCM module 224 is disabled and stops writing the transmission gear selection while the device signal is lost, and will be re-enabled and resume writing the transmission gear selection when the navigation and positioning device signal is received. FQM module 226 becomes disabled and stops recommending the refueling location and amount while the navigation and positioning device signal is lost, becoming re-enabled and resuming making the recommendations when the navigation and positioning device signal returns. TTM module 228 is disabled and chooses the original torque curve until the navigation and positioning device signal returns, then TTM module 228 is enabled and resumes selecting the torque curve. If the navigation and positioning device signal is offline, each of OCM module 220, VSM module 222, DCM module 224, and FQM module 226 become disabled and are not operable.

The navigation and positioning device may provide information including a distance, a speed limit, a grade, and a fuelling station for each of a current location, a look ahead distance, and a route. In certain embodiments, the information received may require revisions. For example, if the speed limit received by the navigation and positioning device indicates the current speed limit is greater than 70 mph, the current speed limit value may be set to 70 mph. Similarly, if the speed limit received by the navigation and positioning device was less than 5 mph, the current speed limit value may be set to 5 mph. The navigation and positioning device may provide an incorrect signal or lose one or both of the frequency signals, L1 frequency and L2 frequency, during the course of the vehicle travelling the travel route. Under such conditions, certain modules may revert to a previously known state.

When the operator sets the cruise speed, the value is set to a Cruise_Set_Speed variable stored in the memory of CEM module 150. When OCM module 220 and/or VSM module 222 are enabled, Cruise_Set_Speed will be updated based on the current speed limit; however, if none of OCM module 220, VSM module 222, and DCM module 224 are enabled, Cruise_Set_Speed will not be affected by the current speed limit. When OCM module 220 and/or VSM module 222 are enabled, Cruise_Set_Speed is set equal to the speed limit minus a "Z" value that is dependent upon whether DCM module 224 is enabled and the state of the OCM module 220 and VSM module 222. When DCM module 224 is disabled, or under conditions preventing DCM module 224 from proper operation, the Z value equals the current speed limit minus a CC_IsochronousSpeed variable. Such conditions preventing DCM module 224 from proper operation include a cruise control bump up or cruise control bump down request when both of OCM module 220 and VSM module 222 are disabled or idle, or a CC_Set, a CC_Accel, or a CC_Coast request is made.

When OCM module 220 and/or VSM module 222, and DCM module 224 are enabled and a cruise control bump up or cruise control bump down request is made, the Z value equals the previous Z value plus or minus one, for example, resulting from.

When OCM module 220 and/or VSM module 222 are enabled, the CC_IsochronousSpeed variable is set to the vehicle speed value corresponding to which module is enabled, respecting the speed setting priority (e.g., if both are enabled, the VSM vehicle speed value has a higher priority and will be used). If both OCM module 220 and VSM module 222 are disabled due to the cruise control bump up or cruise control bump down request, CC_IsochronousSpeed is set to the current vehicle speed minus one, for one time step. If both OCM module 220 and VSM module 222 are otherwise disabled, CC_IsochronousSpeed is set to the Cruise_Set_Speed.

In one non-limiting example, the Cruise_Set_Speed is set to 65 mph along a portion of the travel route having a speed limit of 70 mph, under conditions where OCM module 220 and VSM module 222 are both enabled and making the vehicle system 100 run at 63 mph. When a cruise control bump down request is made by the operator, the CC_IsochronousSpeed will be set at 62 mph for 5 seconds and OCM module 220 and VSM module 222 will both be idle for those 5 seconds, while the Cruise_Set_Speed will be 64 mph. After the 5 seconds of time has elapsed, OCM module 220 and/or VSM module 222 will be re-enabled and resume setting the CC_IsochronousSpeed. In one embodiment, when VSM module 222 is idle or disabled, the CC_IsochronousSpeed will be saved as a Current_Vehicle_Speed variable of the last time step before OCM module 220 and VSM module 222 are idle or disabled, which will disable the writing of CC_IsochronousSpeed. Under these conditions, the Cruise_Set_Speed remains the same and will be changed based on the operation of the cruise control. In one refinement of the embodiment, the Cruise_Set_Speed variable will only be kept the same for a predetermined period of time.

In certain embodiments, one or more condition messages may be associated with each control modules 220, 222, 224, 226, 228 indicating the reason why each module is in an idle state. In one example embodiment, a series of bits may be used as a condition reference map. For example, one byte, consisting of eight bits, may have a condition message for every bit and/or every bit combination.

In the example embodiment, the first bit may be mapped to the message: "GPS is off," indicating to the operator that the connection for the GPS may need to be checked, for example. The second bit may be mapped to the message: "Cruise control is not on." The third bit may be mapped to the message: "Cruise Set, Bump Down, Bump Up, Coast or Accel is pressed." The fourth bit may be mapped to the message: "Engine derate." The fifth bit may be mapped to the message: "Throttle request from the operator." The sixth bit may be mapped to the message: "Speed limit is too low." The seventh bit may be mapped to the message: "GPS has wrong value." The eighth bit may be mapped to the message: "Z value is too large" indicating the difference between the Cruise_Set_Speed and the current speed limit is below a low difference threshold. In certain embodiments, the second bit for each of the OCM module 220 and FQM module 226 may instead be mapped to the message: "GPS information has wrong value."

Each message may be represented by an alphanumeric string of text or by a numeric value, examples of which include, but are not limited, to binary, hexadecimal, and integer values. The message may be displayed to the operator via the GUI on the HMI 160, or by one or more light emitting sources. It is contemplated that in certain embodiments where the one or more light emitting sources are used, the message may be displayed using a series of intermittent flashes, similar to a Morse code, for example.

Embodiments of graphical representations including feedback indicators (e.g., visual, audio and tactile) for display of CEM module 150 inputs and outputs on the GUI of HMI 160 are described in FIGS. 5-10. It is contemplated that each display dialog and module(s) contained therein may contain different, fewer, or additional display and input controls represented in various shapes, sizes, and form types.

Figure 5:
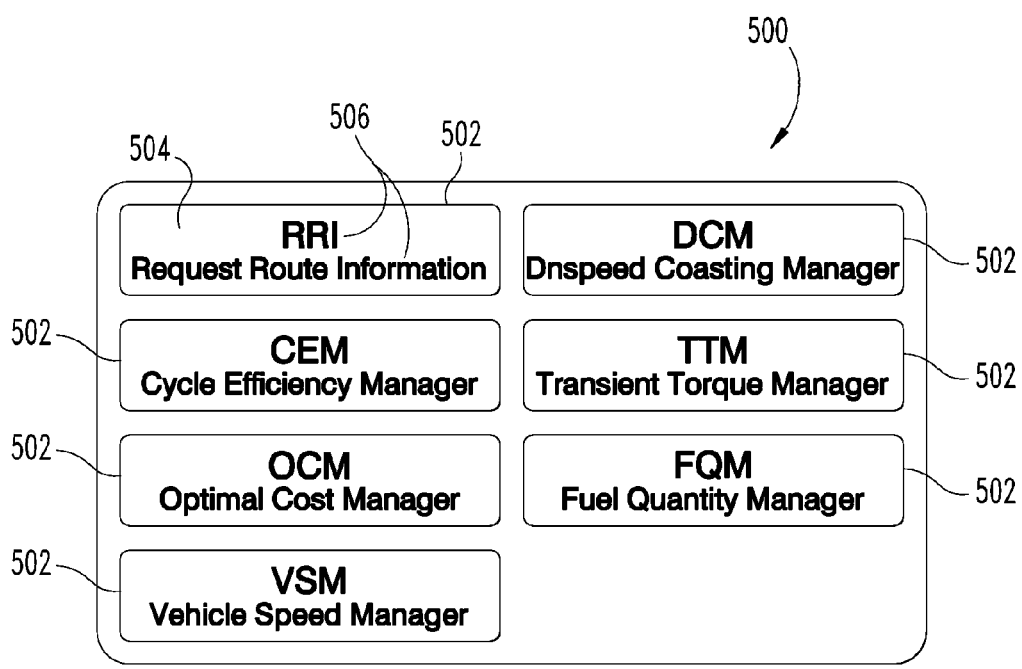
FIG. 5 illustrates an exemplary graphical user interface of a human machine interface.

FIG. 5 illustrates an exemplary embodiment of the state toggle dialog 500, allowing the operator to enable or disable each of the control modules 220, 222, 224, 226, 228. In the illustrated embodiment, each of the control modules 220, 222, 224, 226, 228 is represented by a substantially rectangular shaped button 502 with a descriptive text overlay 506. In certain embodiments, each button's background 504 and descriptive text overlay 506 each may have a color that indicates the state of each control module 220, 222, 224, 226, 228. In one non-limiting example, an enabled button's background color may be green with a black descriptive text overly color, an operator disabled button's background color may be red, and a disabled control module button's descriptive text overly color may be gray.

Figure 6:
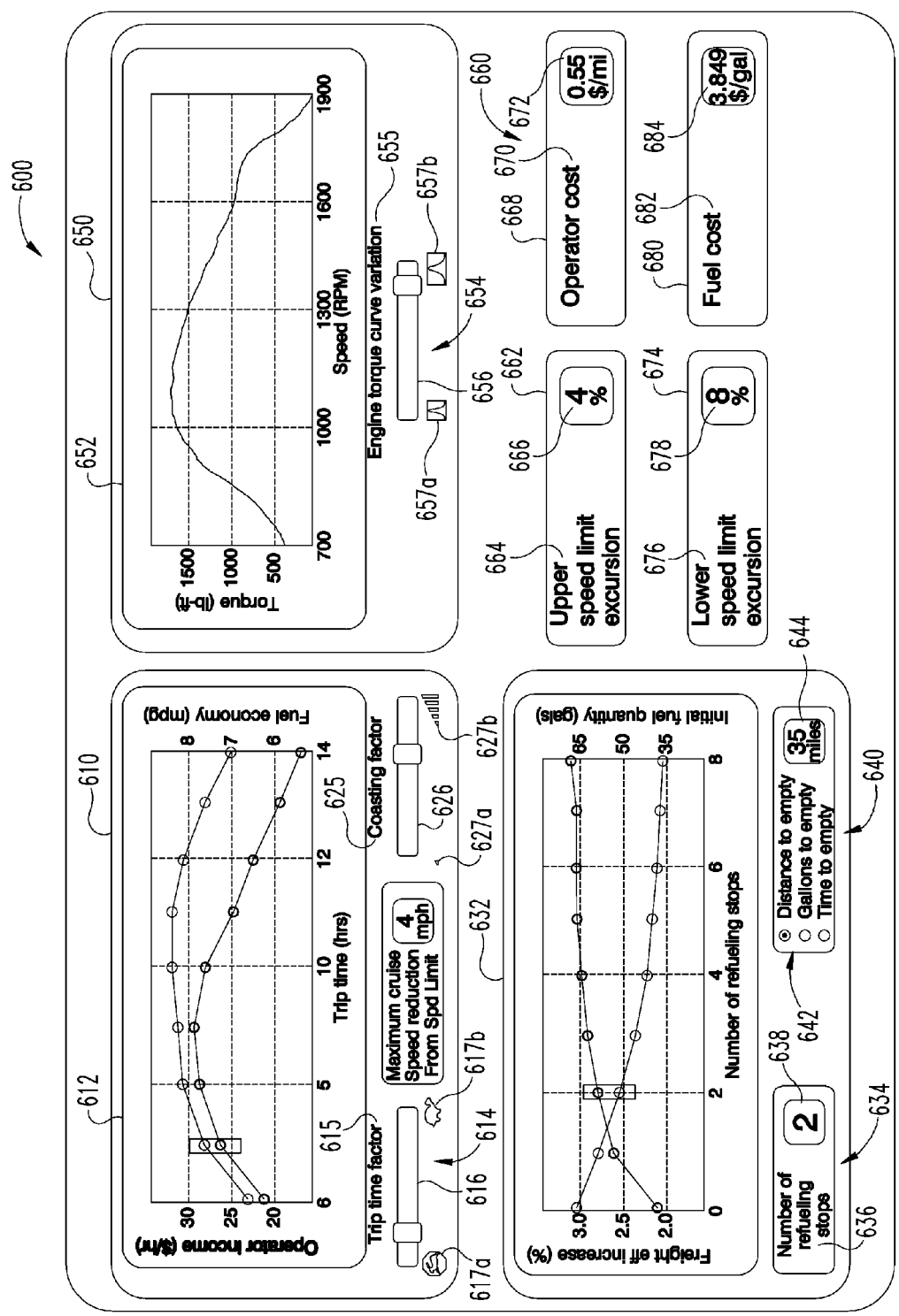
FIG. 6 illustrates an exemplary graphical user interface of a human machine interface.

FIG. 6 illustrates an exemplary embodiment of a preferred parameter display dialog 600. The preferred parameter display dialog 600 includes three panels with graphic displays, each having a substantially rectangular shape, including a fuel economy panel 610, a freight efficiency panel 630, and an engine torque curve panel 650, each providing an operator feedback graphic and accepting one or more operator inputs via operator input controls. The fuel economy panel 610 includes a three axis line chart display 612 having a substantially rectangular display substantially aligned with the top of and extending substantially the width of the fuel economy panel 610. Line chart display 612 includes operator income, in monetary unit cost per hour, and fuel efficiency, in miles per gallon, as the two Y axes and trip time, in hours, as the X axis.

In the illustrated embodiment, a trip time factor input display 614, a maximum cruise speed reduction panel 618, and a coasting factor input display 624 are positioned below line chart display 612, from left to right. Maximum cruise speed reduction panel 618, trip time factor input display 614, and coasting factor input display 624 are horizontally aligned with line chart display 612 and extend substantially along the width of and the remaining height of the fuel economy panel 610. The trip time factor input display 614 includes a trip time factor input slider 616 extending substantially the width of the trip time factor input display 614 with graphical representations 617a and 617b on each end of trip time factor input slider 616, indicating the minimum and maximum slider positions, respectively. The trip time factor input display 614 further includes a descriptive text string display 615 substantially centered above the trip time factor input slider 616. The maximum cruise speed reduction panel 618 is substantially rectangular shaped and includes a second description text string display 620 left-adjacent of a maximum cruise speed reduction from speed limit value display 622. Each display 620, 622 substantially extends to the height of the maximum cruise speed reduction panel 618.

The coasting factor input display 624 includes a coasting factor input slider 626 extending substantially the width of the coasting factor input display 624 with graphical representations 627*a* and 627*b* on each end of coasting factor input slider 626, indicating the minimum and maximum slider positions, respectively. The coasting factor input display 624 further includes a descriptive text string display 625 substantially centered above the coasting factor input slider 626. In certain embodiments, the trip time factor input slider 616 and coasting factor input slider 626 may include additional display features, such as hash marks and hash mark identifying text, for example. It is contemplated that the display unit for fuel efficiency axis of line chart display 612 and speed limit value display 622 may be presented in an alternative unit to mph, such as kph, or kilometers per hour, for example.

The freight efficiency panel 630 includes a three axis line chart display 632 having a substantially rectangular display substantially aligned with the top of and extending substantially the width of the freight efficiency panel 630. Line chart display 632 includes freight efficiency increase, as a percentage, and initial fuel quantity, in gallons, as the two Y axes and number of refueling stops as the X axis. A number of refueling stops panel 634 and a units to empty panel 640 are positioned below line chart display 632, from left to right. The number of refueling stops panel 634 and the units to empty panel 640 are horizontally aligned to line chart display 632 and extend substantially along the width of and the remaining height of the freight efficiency panel 630. The number of refueling stops panel 634 is substantially rectangular shaped and includes a third description text string display 636 left-adjacent of a number of refueling stops value display 638. Each display 636, 638 substantially extends to the height of the number of refueling stops panel 634. The units to empty panel 640 is substantially rectangular shaped and includes a unit selection control 642 left-adjacent of a selected units to empty value display 644. The unit selection control 642 includes a distance to empty option, a gallons to empty option, and a time to empty option. Each of the unit selection control 642 and the selected units to empty value display 644 substantially extend to the height of the units to empty panel 640. It is contemplated, the unit selection control 642 radio group control interface may be replaced with an alternative control interface, such as a drop box selection control, for example.

In the illustrated embodiment, the engine torque curve panel 650 includes a two axis line chart display 652 having a substantially rectangular shape that is substantially aligned with the top of and extending substantially the width of engine torque curve panel 650. Line chart display 652 includes torque, in pound-feet, as the Y axis and speed, in revolutions per minute, as the X axis. The engine torque curve panel 650 further includes an engine torque curve variation display 654 that is positioned below and substantially parallel to line chart display 652. Engine torque curve variation display 654 is horizontally aligned with and centered on the width of and the remaining height of the engine torque curve panel 650. The engine torque curve variation display 654 includes an engine torque curve variation slider 656 extending substantially the width of the engine torque curve variation display 654 with graphical representations 657*a* and 657*b* on each end of engine torque curve variation slider 656, indicating the minimum and maximum slider positions, respectively. The engine torque curve variation display 654 further includes a fourth descriptive text string display 655 substantially centered above the engine torque curve variation slider 656. In certain embodiments, the engine torque curve variation slider 656 may include additional display features, such as hash marks and hash mark identifying text, for example.

The preferred parameter display dialog 600 further includes a cost and speed limit excursion display area 660 that includes an upper speed limit excursion feedback display 662, an operator cost feedback display 668, a lower speed limit excursion feedback display 674, and a fuel cost feedback display 680, each having a substantially rectangular shape. The displays 662, 668, 674, 680 are displayed in a two column by two row configuration, the column widths being substantially equally divided and substantially extending the width of the speed limit excursion display area 660.

Each of the fuel economy panel 610, the freight efficiency panel 620, the engine torque curve panel 630, and the cost and speed limit excursion display area 640 are displayed in separate quadrants of the preferred parameter display dialog 600, with the of the fuel economy panel 610 in the upper-left corner, the freight efficiency panel 620 in the lower-left corner, the engine torque curve panel 630 in the upper-right corner, and the cost and speed limit excursion display area 640 in the lower-right corner. It is contemplated that in certain embodiments, the order in which the panels and display area is presented in the preferred parameter display dialog 600 quadrants may be different than in the illustrated embodiment. It is further contemplated that the display units for any of the displayed input and output may be presented in an alternative unit to the display unit reference in the exemplary embodiment illustrated in FIG. 6.

Figure 7:
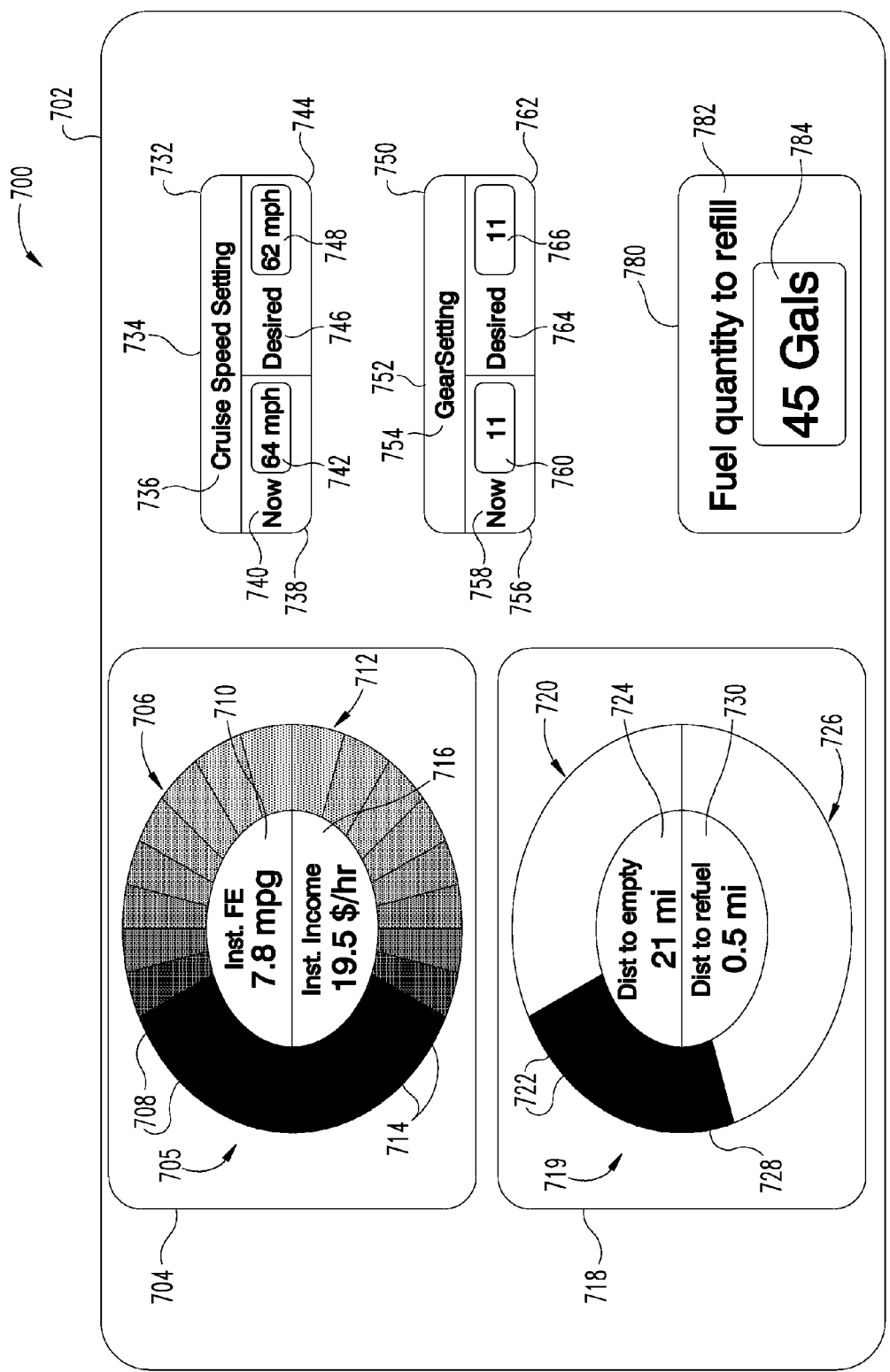
FIG. 7 illustrates an exemplary graphical user interface of a human machine interface.
Figure 8:
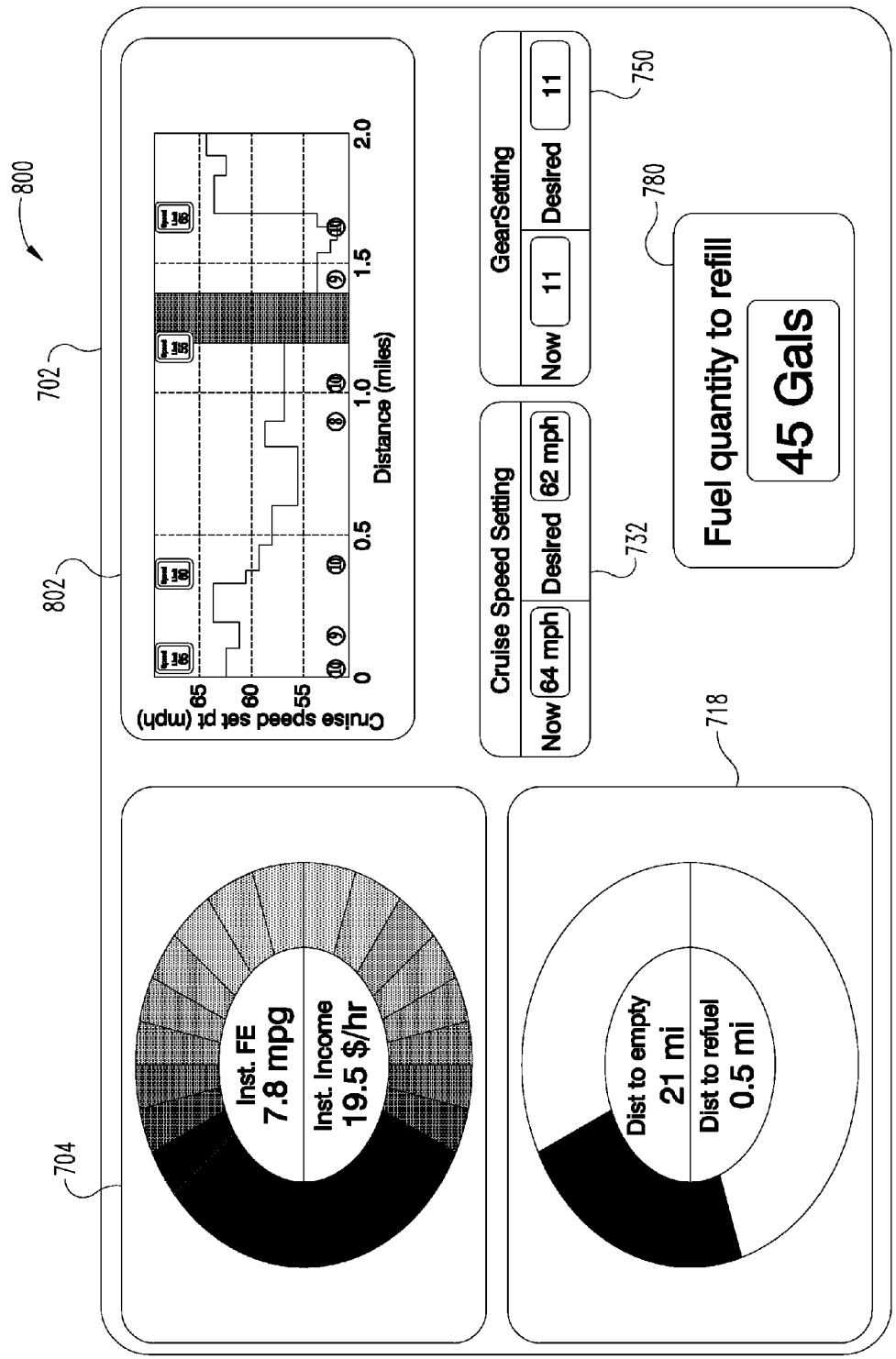
FIG. 8 illustrates an exemplary graphical user interface of a human machine interface.
Figure 9:
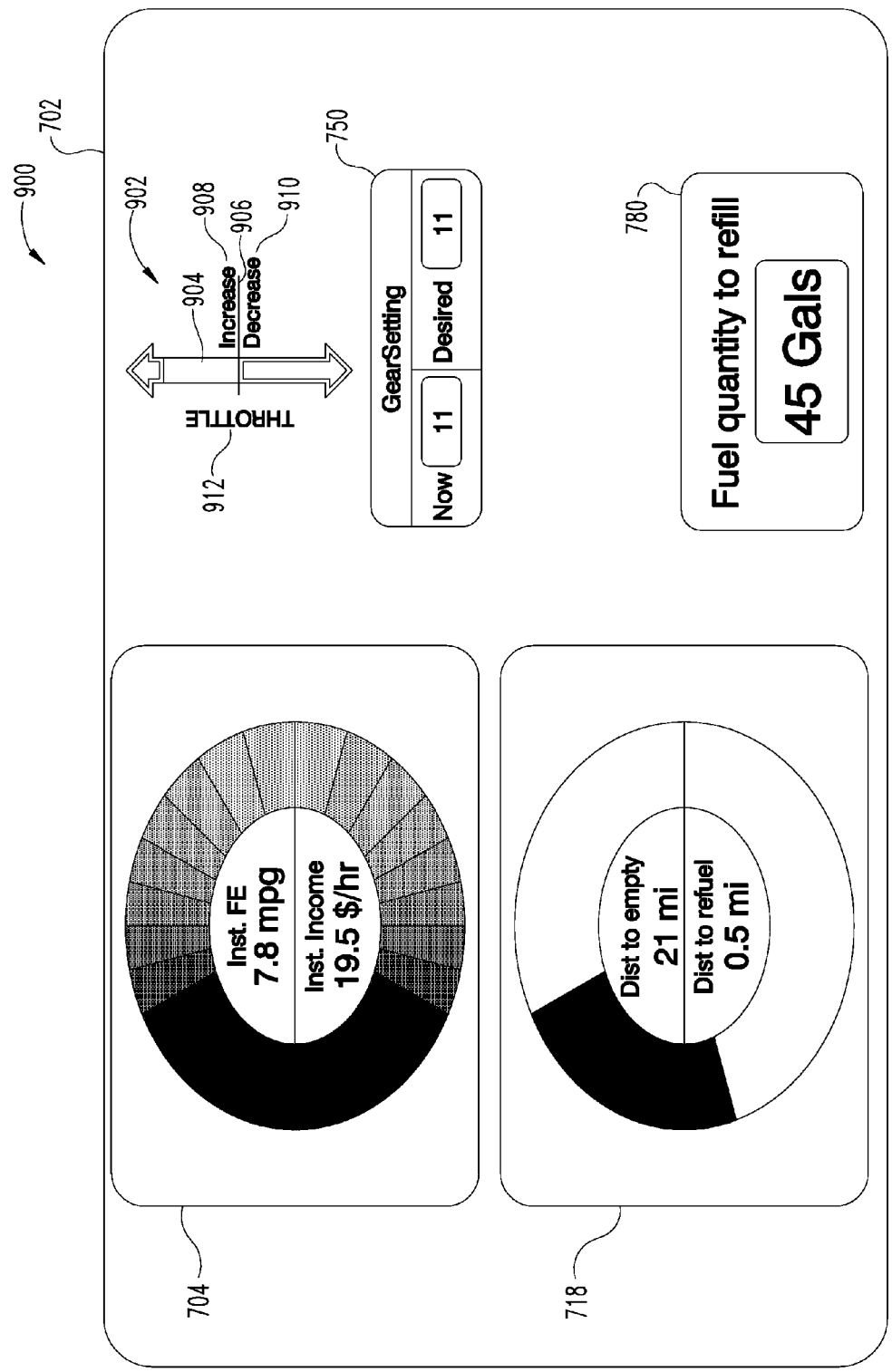
FIG. 9 illustrates an exemplary graphical user interface of a human machine interface.
Figure 10:
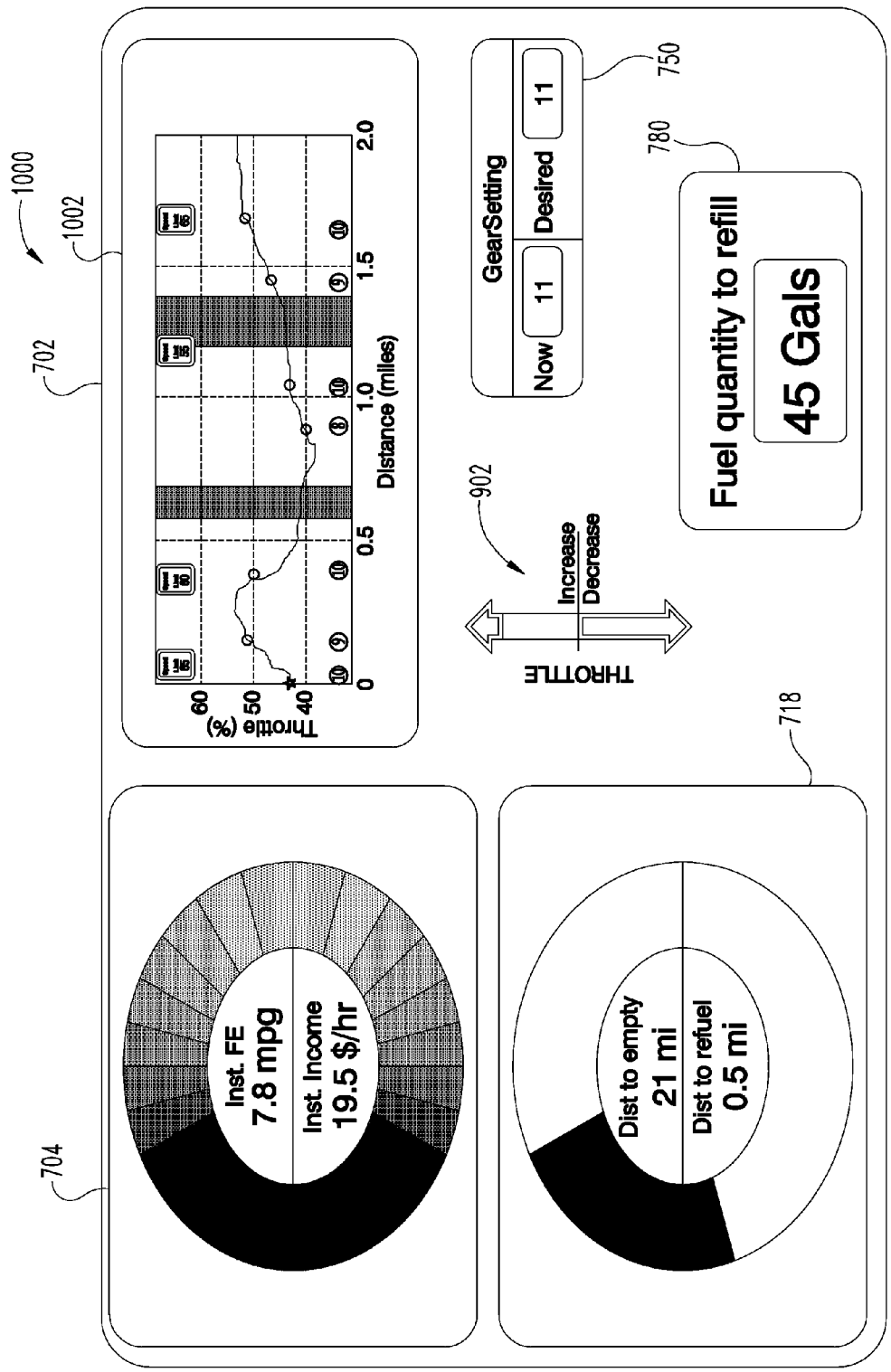
FIG. 10 illustrates an exemplary graphical user interface of a human machine interface.

FIGS. 7-10 illustrate alternative embodiments for a performance and recommendation dialog. FIGS. 7-8 illustrate alternative performance and recommendation dialog layouts 700, 800 in cruise control mode. FIGS. 9-10 illustrate alternative performance and recommendation dialog layouts 900, 1000 in manual control mode. Each of the alternative embodiments for performance and recommendation dialog layouts 700, 800, 900 and 1000 include an instantaneous feedback panel 704, a units to empty/refuel panel 718, and a fuel refill quantity panel 780, each of which are positioned on the performance and recommendation dialog 702 in the substantially same location. The instantaneous feedback panel 704 is positioned in the upper-left corner of the performance and recommendation dialog 702, while the units to empty/refuel panel 718 is positioned in the lower-left corner of the performance and recommendation dialog 702. The fuel refill quantity panel 780 is positioned in the lower-right corner of the performance and recommendation dialog 702. It is contemplated that the locations, shapes, and sizes of each of the panels and their respective controls may be placed in alternative locations on the performance and recommendation dialog 702, use different shapes, or be displayed in different sizes than in the illustrated embodiments.

The instantaneous feedback panel 704 is substantially rectangular in shape and includes an instantaneous feedback display 705 having a substantially elliptic shape. The instantaneous feedback display 705 includes a top portion 706 having an instantaneous fuel economy text display 710 and one or more visual indicators 708, and a first bottom portion 712 having an instantaneous income text display 716 and one or more first visual indicators 714. The top portion 706 and bottom portion 712 are substantially equally separated along the middle of instantaneous feedback display 705, a division which extends substantially parallel to the top of instantaneous feedback panel 704. The instantaneous fuel economy text display 710 and the instantaneous income text display 716 are enclosed in a substantially elliptic shape in the substantially center interior of the instantaneous feedback display 705. The top and bottom portion visual indicators 708, 714 are substantially quadrilateral shaped and substantially extend from the outer ring encapsulating the instantaneous fuel economy text display 710 and the instantaneous income text display 716 to the outer ring of the instantaneous feedback display 705. It should be noted that not all of the visual indicators 708, 714 are identified in the illustrated embodiment to preserve clarity. The top portion visual indicators 708 provide a visual cue to the operator of a performance level of the instantaneous fuel economy. As the performance level of the instantaneous fuel economy is decreased toward the minimum, one or more of the top portion visual indicators 708 will no longer be displayed. When the performance level of the instantaneous fuel economy is at the minimum level, none of the top portion visual indicators 708 will be displayed, and when the performance level is at the maximum level, all of the top portion visual indicators 708 will be displayed. The bottom portion visual indicators 714 have a display toggle that operates in the same manner as the top portion visual indicators 708, only representing instantaneous income instead of instantaneous fuel economy.

The units to empty/refuel panel 718 is substantially rectangular in shape and may functionally operate and aesthetically appear similar to the instantaneous feedback panel 704, only representing different data sets. The units to empty/refuel panel 718 includes a units to empty/refuel feedback display 719 having a substantially elliptic shape. The units to empty/refuel feedback display 719 includes a top portion 720 having a units to empty text display 724 and one or more visual indicators 722, and a second bottom portion 726 having a units to refuel text display 730 and one or more second visual indicators 728. The top portion 720 and bottom portion 726 are substantially equally separated along the middle of units to empty/refuel panel 718, a division which extends substantially parallel to the top of instantaneous feedback panel 704. The units to empty text display 724 and the units to refuel text display 730 are enclosed in a substantially elliptic shape in the substantially center interior of the units to empty/refuel feedback display 719.

The top and bottom portion visual indicators 722, 728 are substantially quadrilateral shaped and substantially extend from the outer ring encapsulating the units to empty text display 724 and the units to refuel text display 730 to the outer ring of the units to empty/refuel feedback display 719. It should be noted that not all of the visual indicators 722, 728 are identified in the illustrated embodiment to preserve clarity. The top portion visual indicators 722 provide a visual cue to the operator of the units remaining until vehicle system 100 will have an empty fuel tank. As the fuel tank level is decreased toward empty, one or more of the top portion visual indicators 722 will no longer be displayed. When the number of units until an empty fuel tank is at the minimum unit quantity level, none of the top portion visual indicators 722 will be displayed, and when the number of units until an empty fuel tank is at the maximum unit quantity level, all of the top portion visual indicators 722 will be displayed. The bottom portion visual indicators 728 have a display toggle that operates in the same manner as the top portion visual indicators 722, only representing units to refuel instead of units to empty.

The fuel refill quantity panel 780 is substantially rectangular shaped and includes a tenth description text string display 782 substantially centered and parallel to the top of the fuel refill quantity panel 780. The fuel refill quantity panel 780 further includes a fuel quantity to refill value display 784. Each display 782, 784 substantially extends the width of the fuel refill quantity panel 780.

In the illustrated embodiment of performance and recommendation dialog layout 700 in FIG. 7, the performance and recommendation dialog 702 further includes a cruise speed setting panel 732 and a gear setting panel 750 positioned in the upper-right quadrant of the performance and recommendation dialog with gear setting panel 750 positioned below and substantially parallel with cruise speed setting panel 732. The cruise speed setting panel 732 is substantially rectangular in shape and substantially parallel with gear setting panel 750. The cruise speed setting panel 732 may be divided into a top portion 734 extending substantially the width of the cruise speed setting panel 732, a first bottom-left portion 738, and a first bottom-right portion 744. The top portion 734 includes a description text display 736 notifying the operator of what data the cruise speed setting panel 732 represents. The bottom-left portion 738 includes a current cruise speed value display 742 and a fifth description text display 740 notifying the operator what the data in current cruise speed value display 742 represents. The bottom-right portion 744 includes a desired cruise speed value display 748 and a sixth description text display 746 notifying the operator what the data in desired cruise speed value display 748 represents.

The gear setting panel 750 is substantially rectangular in shape and may be divided into a top portion 752 extending substantially the width of the gear setting panel 750, a second bottom-left portion 756, and a second bottom-right portion 762. The top portion 752 includes a seventh description text display 754 notifying the operator of what data the gear setting panel 750 represents. The bottom-left portion 756 includes a current gear value display 760 and an eighth description text display 758 notifying the operator what the data in current gear value display 760 represents. The bottom-right portion 762 includes a desired gear value display 766 and a ninth description text display 764 notifying the operator what the data in desired gear value display 766 represents.

In the illustrated embodiment of performance and recommendation dialog layout 800 in FIG. 8, the performance and recommendation dialog 702 further includes a two axis line chart display 802 having a substantially rectangular shape that is substantially aligned with the top of the performance and recommendation dialog 702 and is positioned in the upper right quadrant of the performance and recommendation dialog 702. Line chart display 802 includes cruise speed set point, in miles per hour, as the Y axis and distance, in miles, as the X axis. Line chart display 802 may further include visual indicators of road data, such as speed limit changes, and regions where active control may not be available. In layout 700, the cruise speed setting panel 732 and gear setting panel 750 are positioned side-by-side from left to right below line chart display 802, above fuel refill quantity panel 780, and to the right of instantaneous feedback panel 704 and units to empty/refuel panel 718.

The performance and recommendation dialog layouts 900, 1000 illustrated in FIGS. 9-10 illustrate the performance and recommendation dialog 702 in manual control mode. Generally, when operating in manual control mode, cruise speed setting panel 732 is not displayed. Each of the performance and recommendation dialog layouts 900 and 1000 include a throttle indicator control 902 to indicate to the operator whether to apply more or less throttle. The throttle indicator control 902 includes a double-sided arrow 904 positioned vertically with a dividing line 906 positioned in the middle of the double sided arrow 904 and extending substantially parallel to the top of performance and recommendation dialog 702. The throttle indicator control 902 further includes an first increase side description text display 908, a second decrease side description text display 910, and a third throttle indicator description text display 912. The increase side description text display 908 aligns the description text horizontally and is positioned above the dividing line and to the right of the double sided arrow 904. The decrease side description text display 910 aligns the description text horizontally and is positioned below the dividing line and to the right of the double sided arrow 904. The throttle indicator description text display 912 aligns the description text vertically and is positioned to the left of the double sided arrow 904. In the illustrated layout, the throttle indicator control 902 is positioned in the upper right corner of the performance and recommendation dialog 702, above the gear setting panel 75 and to the right of the instantaneous feedback panel 704.

In the illustrated embodiment of performance and recommendation dialog layout 1000 in FIG. 10, the performance and recommendation dialog 702 further includes a two axis line chart display 1002 having a substantially rectangular shape that is substantially aligned with the top of the performance and recommendation dialog 702 and is positioned in the upper right quadrant of the performance and recommendation dialog 702. Line chart display 1002 includes a throttle position, as a percentage, as the Y axis and distance, in miles, as the X axis. Line chart display 1002 may further include visual indicators of road data, such as speed limit changes, and regions where active control may not be available. In layout 1000, the throttle indicator control 902 and the gear setting panel 750 are positioned side-by-side from left to right below line chart display 802, above fuel refill quantity panel 780, and to the right of instantaneous feedback panel 704 and units to empty/refuel panel 718.

Communications between the CEM module 150 and the other control units in vehicle system, ECU 130, TCU 140, braking system electronic control unit and cruise control electronic control unit to name a few, may involve sending controller area network (CAN) messages across the CAN bus. The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. HMI 160 and CEM module 150 may use the CAN bus to relay messages regarding operator defined preferences and values for display on the HMI 160 GUI. In an exemplary embodiment of a CAN message communicated between the CEM module 150 and the HMI 160, the CAN message consists of eight eight-bit bytes (i.e. eight octets), or 64 bits, using least significant bit numbering where one or more bits in the message may correspond to a particular input or output value. It is contemplated that in certain embodiments an alternative vehicle bus protocol may be used, such as a vehicle area network (VAN) or one of the Society of Automotive Engineers (SAE) vehicle bus protocols, for example.

In one embodiment of a CAN message sent from the CEM module 150 to HMI 160, the first byte contains which of the operation control modules 220, 222, 224, 226, 228 are enabled. Specifically, the zeroth bit contains whether the FQM module 226 is enabled, the first bit contains whether the DCM module 224 is enabled, the second bit contains whether the TTM module 228 is enabled, the third bit contains whether the VSM module 222 is enabled, the fourth bit contains whether the OCM module 220 is enabled, the fifth bit contains whether the CEM module 150 itself is enabled, and the sixth and seventh bits are not used. The second byte contains an instantaneous fuel efficiency data value, the third byte contains an expected current fuel efficiency data value, and the fourth byte contains an expected route fuel efficiency data value. The fifth byte contains a freight efficiency increase data value from the FQM module 226, the sixth byte contains a max cruise speed reduced from speed limit data value, and the seventh and eighth bytes are not used.

In another embodiment of a CAN message sent from the CEM module 150 to HMI 160, the first and second bytes include an instantaneous operating income data value in dollars per hour, the third and fourth bytes include an expected current operating income data value in dollars per hour, the fifth and sixth bytes include an expected route operating income data value in dollars per hour, and the seventh and eighth bytes are not used.

In yet another embodiment of a CAN message sent from the CEM module 150 to HMI 160, the first and second bytes include a recommended fuel volume buffer data value, the third and fourth bytes include a next fuel volume to purchase data value, the fifth and sixth bytes include a fuel stop distance data value in miles, and the seventh and eighth bytes are not used.

In still another embodiment of a CAN message sent from the CEM module 150 to HMI 160, the first byte contains a desired cruise speed set data value, bits eight through eleven contain a desired acceleration change data value, bits twelve through sixteen contain a desired gear data value, bit seventeen contains a fuel stops required data value, and bits eighteen to thirty-one contain a distance data value. The remaining bits replicate the previous bits, only with data values for a predetermined distance look ahead, such as 200 meters, or 2 kilometers, for example.

In one embodiment of a CAN message sent to the CEM module 150 from HMI 160, the first byte contains an operator enabled state change data value indicating which of the operation control modules 220, 222, 224, 226, 228 are enabled. Specifically, the zeroth bit contains whether the FQM module 226 is enabled, the first bit contains whether the DCM module 224 is enabled, the second bit contains whether the TTM module 228 is enabled, the third bit contains whether the VSM module 222 is enabled, the fourth bit contains whether the OCM module 220 is enabled, the fifth bit contains whether the CEM module 150 itself is enabled, the sixth bit contains whether the RRI module is enabled, and seventh bit is not used. Byte two contains a number of refueling stops data value, but only the first four bits are used. Bytes three and four contain a fuel volume buffer data value, bytes five and six contain a fuel distance buffer data value, and bytes seven and eight contain a fuel time buffer data value.

In another embodiment of a CAN message sent to the CEM module 150 from HMI 160, the first byte contains a time factor data value, the second byte contains a coasting factor data value, the third byte contains an engine torque curve variation data value, the fourth byte contains an operator cost per kilometer data value, and the fifth and sixth bytes contain a fuel cost data value in dollars per liter. The first four bits of the seventh byte contain an upper speed limit data value and the last four bits contain a lower speed limit data value. The eighth byte is not used.

As is evident from the figures and text presented above, a variety of embodiments according to the present application are contemplated. In one aspect, the present application relates to a fuel optimization method for a vehicle travelling along a travel route, including determining a first vehicle speed profile and an adjusted travel time based on the travel route including a travel time, a route grade and a route distance, determining a second vehicle speed profile, a first throttle profile, and a first transmission gear profile, each based on the first vehicle speed profile, the adjusted travel time and the travel route, determining a second vehicle throttle profile and a second transmission gear profile, each based on the first vehicle speed profile, the second vehicle speed profile and/or the first vehicle throttle profile, determining a refuel quantity and a refuel location based on the first vehicle speed profile and/or the second vehicle speed profile, and determining a torque curve based on the travel route, the first vehicle speed profile and/or the second vehicle speed profile.

In one embodiment, determining the first vehicle speed profile is further based on at least one of an operator cost, a fuel cost, a transmission shift schedule, an engine fueling map output, the travel time, a travel time factor, an elevation profile, and the route grade. In another embodiment, determining the second vehicle profile, the first throttle profile, and the first transmission gear profile are further based on at least one of the route distance, an elevation profile, the travel time, a travel time factor, a transmission shift schedule, an engine fueling map output, the route grade, a transmission gear ratio, and a drivetrain efficiency. In still another embodiment, determining the second vehicle throttle profile and the second transmission gear profile are further based on at least one of an engine friction map output, a transmission gear ratio, a drivetrain efficiency, an elevation profile, and the route grade. In yet another embodiment, determining the refuel quantity and a refuel location is further based on at least one of a number of refuel stops, one or more refueling locations, a fuel cost, and a fuel tank amount. In still yet another embodiment, determining the torque curve is further based on an engine fuelling map output, a transmission gear ratio, a drivetrain efficiency, an elevation profile, and the route grade.

In another aspect, the present application relates to a system, including an electronic controller connected to a vehicle, the vehicle including a vehicle powertrain that includes an engine, a transmission, and a final drive. The system includes a human machine interface (HIM) including a graphical user interface (GUI) directed to relaying information between an operator and the electronic controller. The system further includes an electronic control unit (ECU) directed to regulating and controlling the operation of the engine and a transmission control unit (TCM) directed to regulating and controlling the operation of a transmission. The system still further includes a plurality of vehicle sensors operably connected to receive and transmit conditions of the vehicle, the plurality of sensor in operative communication with the electronic controller.

The electronic controller includes an operator cost management (OCM) module configured to determine an OCM travel time and an OCM vehicle speed profile based on a travel route defined by the operator including a travel time and a route distance, a vehicle speed management (VSM) module configured to determine a VSM vehicle speed profile, a VSM throttle profile, and a VSM transmission gear profile, each based on the travel route and the OCM travel time, a downspeed coasting management (DCM) module configured to determine a DCM transmission gear profile and a DCM throttle profile based on the VSM vehicle speed profile and/or the OCM vehicle speed profile, a fuel quantity management (FQM) module configured to determine a refuel quantity and a refuel location based on the VSM vehicle speed profile and/or the OCM vehicle speed profile, and a transient torque management (TTM) module configured to determine a torque curve based on the VSM vehicle speed profile and/or the OCM vehicle speed profile, output a refueling request to the HMI to notify the operator of the refuel quantity and the refuel location, and output the torque curve to the ECU.

In one embodiment, the electronic controller is operable in an active control mode, where the electronic controller has active control of the vehicle speed through powertrain components, and a passive control mode, where the electronic controller identifies recommendations for the operator to control the vehicle speed. In one refinement, the electronic controller will automatically enter passive control mode in response to an off nominal condition being detected. In another refinement, the off nominal condition includes detecting at least one of a brake being pressed by the operator, a severe weather condition, a severe traffic condition, an engine derate condition, and a drop in speed limits indicating rural conditions.

In another embodiment, each of the OCM module, the VCM, module, the DCM module, the FQM module, and the TTM module are further configured to be disabled by one of the electronic controller and the operator. In one refinement, each of the OCM module and the VSM module are only active to be enabled when the vehicle is in an active cruise control mode.

In still another embodiment, the electronic controller is further configured to receive a fuel cost input from the operator, and wherein determining the OCM travel time and the OCM vehicle speed profile are each further based on the fuel cost input.

In still yet another embodiment, the electronic controller further includes a transmission gear arbitration module, a cruise control arbitration module, and a throttle arbitration module. The transmission gear arbitration module is configured to receive the DCM transmission gear profile and the VSM transmission gear profile and output a transmission gear command to the TCM. The cruise control arbitration module is configured to receive the OCM vehicle speed profile and the VSM vehicle speed profile and output a cruise speed command to the ECU. The throttle arbitration module is configured to receive the DCM throttle profile and the VSM throttle profile and output a throttle command to the ECU.

One aspect of the present application includes a method, comprising: receiving, from a plurality of input devices, an operator defined parameter, a fuel amount, a weather condition, a current vehicle condition, and a route condition; determining one or more vehicle trip conditions based on at least one of the fuel amount, the weather condition, the route condition, the current vehicle condition, and the operator defined parameter; determining, with a cycle efficiency management (CEM) module, an operation mode based on the one or more vehicle trip conditions and at least one of the fuel amount, the weather condition, the route condition, the current vehicle condition, and the operator defined parameter; and controlling a vehicle to operate in one of an active control mode and a passive control mode based on the operation mode, wherein controlling the vehicle in the passive control mode includes: determining, with the CEM module, an operator feedback parameter based on at least one of the fuel amount, the weather condition, the route condition, the current vehicle condition, and the operator defined parameter, providing an operator feedback command from the CEM module to a human machine interface (HMI) based on the operator feedback parameter, and providing, with the human machine interface, a feedback indicator based on the operator feedback command, wherein controlling the vehicle in the active control mode includes: determining, with the CEM module, a control command based on the one or more vehicle trip conditions and at least one of the fuel amount, the weather condition, the route condition, the current vehicle condition, and the operator defined parameter, and providing the control command to an engine control unit for controlling at least one aspect of the vehicle based on the control command.

Features of the aspect may include: wherein the operator defined parameter further includes at least one of a fuel quantity buffer input, an allowable upper speed limit variance, an allowable lower speed limit variance, and a request route message; wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill; wherein the operator feedback command is provided in real time at any point along a vehicle route; wherein the operator defined parameter includes at least one of an operator cost, a fuel cost, a trip time, a trip time factor, a coasting factor, a cruise control speed setting, a requested speed, a throttle gear setting, a speed limit excursion, an engine torque curve variation factor, and a number of refueling stops; wherein the weather condition is indicative of at least one of a humidity level, a wind condition, and a precipitation condition; wherein the route condition is indicative of at least one of a trip distance, an elevation profile, a route grade profile, a maximum speed limit, a minimum speed limit, a traffic condition, and a road condition; wherein the one or more vehicle trip conditions includes a fuel economy, a coasting gear selection, a freight efficiency, and a fuel economy; wherein the control command includes at least one of a transmission gear command, a cruise speed command, a torque curve command, and a throttle command; wherein controlling at least one aspect of the vehicle includes controlling at least one of a transmission, a cruise control setting, a torque provider, and a throttle; further comprising detecting an off nominal condition, the off nominal condition including at least one of a brake being pressed by the operator, a weather condition, a traffic condition, an engine derate condition, and a speed limit being below a speed limit threshold; wherein determining the operation mode is further based on an operator induced event, wherein the operator induced event includes at least one of a brake being pressed by the operator, a throttle position being greater than or equal to a throttle position threshold, and a throttle position rate being greater than or equal to a throttle position rate threshold; wherein the current vehicle condition includes at least one of a transmission operating condition and an engine operating condition; wherein the feedback indicator includes at least one of a visual feedback indicator, an auditory feedback indicator, and a tactile indicator; wherein providing, with the human machine interface, the feedback indicator includes displaying the feedback indicator on a graphical user interface.

Another aspect of the present application may include a system, comprising: a vehicle including an internal combustion engine; a controller in electrical communication with the internal combustion engine and a plurality of input devices operable to provide signals indicating conditions of the vehicle, wherein the controller is structured to: receive, from the plurality of input devices, an operator defined parameter, a fuel amount, a weather condition, a current vehicle condition, and a route condition; determine one or more vehicle trip conditions based on at least one of the fuel amount, the weather condition, the route condition, the current vehicle condition, and the operator defined parameter; determine an operation mode based on the one or more vehicle trip conditions and at least one of the fuel amount, the weather condition, the route condition, the current vehicle condition, and the operator defined parameter; and control the vehicle to operate in one of an active control mode and a passive control mode based on the operation mode, wherein the passive control mode includes: determining an operator feedback parameter based on at least one of the fuel amount, the weather condition, the route condition, the current vehicle condition, and the operator defined parameter, providing an operator feedback command from the controller to a human machine interface (HMI) based on the operator feedback parameter, and providing, with the human machine interface, a feedback indicator based on the operator feedback command, wherein the active control mode includes: determining a control command based on the one or more vehicle trip conditions and at least one of the fuel amount, the weather condition, the route condition, the current vehicle condition, and the operator defined parameter, and providing the control command to an engine control unit for controlling at least one aspect of the vehicle based on the control command.

Features of the aspect may include: wherein the controller and the engine control unit are different devices; wherein the controller and the engine control unit are device; wherein the operator defined parameter further includes at least one of a fuel quantity buffer input, an allowable upper speed limit variance, an allowable lower speed limit variance, and a request route message; wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill; wherein the operator feedback command is provided in real time at any point along a vehicle route; wherein the control command includes at least one of a transmission gear command, a cruise speed command, a torque curve command, and a throttle command; wherein the controller is further structured to detect an off nominal condition, the off nominal condition including at least one of a brake being pressed by the operator, a weather condition, a traffic condition, an engine derate condition, and a speed limit being below a speed limit threshold; wherein the controller is structured to determine the operation mode based on an operator induced event, wherein the operator induced event includes at least one of a brake being pressed by the operator, a throttle position being greater than or equal to a throttle position threshold, and a throttle position rate being greater than or equal to a throttle position rate threshold; wherein the feedback indicator includes at least one of a visual feedback indicator, an auditory feedback indicator, and a tactile indicator; wherein the human machine interface is structured to display the feedback indicator on a graphical user interface.

Yet another aspect of the present application may include a method, comprising: receiving operation conditions from a plurality of input devices; determining one or more vehicle trip conditions based on the operation conditions; determining an operation mode based on the one or more vehicle trip conditions and at least one of the operation conditions; and controlling a vehicle to operate in one of an active control mode and a passive control mode based on the operation mode, wherein controlling the vehicle in the passive control mode includes: determining an operator feedback parameter based on at least one of the operation conditions, providing an operator feedback command to a human machine interface based on the operator feedback parameter, and providing, with the human machine interface, a feedback indicator based on the operator feedback command, wherein controlling the vehicle in the active control mode includes: determining a control command based on the one or more vehicle trip conditions and at least one of the operation conditions; and providing the control command to an engine control unit for controlling at least one aspect of the vehicle based on the control command.

Features of the aspect may include: wherein the various conditions include an operator defined parameter, a fuel amount, a weather condition, a current vehicle condition, and a route condition; wherein the operator defined parameter further includes at least one of a fuel quantity buffer input, an allowable upper speed limit variance, an allowable lower speed limit variance, and a request route message; wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill; wherein the operator feedback command is provided in real time at any point along a vehicle route; wherein the route condition is indicative of at least one of a trip distance, an elevation profile, a route grade profile, a maximum speed limit, a minimum speed limit, a traffic condition, and a road condition; wherein the one or more vehicle trip conditions includes a fuel economy, a coasting gear selection, a freight efficiency, and a fuel economy; wherein the control command includes at least one of a transmission gear command, a cruise speed command, a torque curve command, and a throttle command; wherein controlling at least one aspect of the vehicle includes controlling at least one of a transmission, a cruise control setting, a torque provider, and a throttle; wherein determining the operation mode is further based on an operator induced event, wherein the operator induced event includes at least one of a brake being pressed by the operator, a throttle position being greater than or equal to a throttle position threshold, and a throttle position rate being greater than or equal to a throttle position rate threshold; wherein the feedback indicator includes at least one of a visual feedback indicator, an auditory feedback indicator, and a tactile indicator; wherein providing, with the human machine interface, the feedback indicator includes displaying the feedback indicator on a graphical user interface.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    receiving, with a cycle efficiency management (CEM) module, conditions of a vehicle including an operator defined parameter, a fuel amount, a weather condition, a current vehicle condition, and a route condition;
    determining, with the CEM module, one or more vehicle trip conditions based on at least one of the fuel amount, the weather condition, the route condition, the current vehicle condition, and the operator defined parameter;
    determining, with the CEM module, to switch an operation mode of the vehicle from an active control mode to a passive control mode or from the passive control mode to the active control mode based on the one or more vehicle trip conditions and at least one of the fuel amount, the weather condition, the route condition, the current vehicle condition, and the operator defined parameter; and
    controlling, with the CEM module, the vehicle to operate in the operation mode determined by the CEM module,
    wherein controlling the vehicle in the passive control mode includes:
        determining, with the CEM module, an operator feedback command based on at least one of the fuel amount, the weather condition, the route condition, the current vehicle condition, and the operator defined parameter,
        providing the operator feedback command from the CEM module to a human machine interface (HMI), and
        providing, with the human machine interface, a feedback indicator based on the operator feedback command,
    wherein controlling the vehicle in the active control mode includes:
        determining, with the CEM module, a control command based on the one or more vehicle trip conditions and at least one of the fuel amount, the weather condition, the route condition, the current vehicle condition, and the operator defined parameter, and
        providing the control command from the CEM module to an engine control unit for controlling, at least one aspect of the vehicle based on the control command.

2. The method of claim 1, wherein the operator defined parameter further includes at least one of a fuel quantity buffer input, an allowable upper speed limit variance, an allowable lower speed limit variance, and a request route message.

3. The method of claim 1, wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill.

4. The method of claim 1, wherein the operator feedback command is provided in real time at any point along a vehicle route.

5. The method of claim 1, wherein the operator defined parameter includes at least one of an operator cost, a fuel cost, a trip time, a trip time factor, a coasting factor, a cruise control speed setting, a requested speed, a throttle gear setting, a speed limit excursion, an engine torque curve variation factor, and a number of refueling stops.

6. The method of claim 1, wherein the weather condition is indicative of at least one of a humidity level, a wind condition, and a precipitation condition.

7. The method of claim 1, wherein the route condition is indicative of at least one of a trip distance, an elevation profile, a route grade profile, a maximum speed limit, a minimum speed limit, a traffic condition, and a road condition.

8. The method of claim 1, wherein the one or more vehicle trip conditions includes a coasting gear selection, a freight efficiency, and a fuel economy.

9. The method of claim 1, wherein the control command includes at least one of a transmission gear command, a cruise speed command, a torque curve command, and a throttle command.

10. The method of claim 1, wherein controlling at least one aspect of the vehicle includes controlling at least one of a transmission, a cruise control setting, a torque provider, and a throttle.

11. The method of claim 1, further comprising detecting an off nominal condition, the off nominal condition including at least one of a brake being pressed by the operator, a severe weather condition, a severe traffic condition, an engine derate condition, and a speed limit being below a speed limit threshold.

12. The method of claim 1, wherein determining the operation mode is further based on an operator induced event, wherein the operator induced event includes at least one of a brake being pressed by the operator, a throttle position being greater than or equal to a throttle position threshold, and a throttle position rate being greater than or equal to a throttle position rate threshold.

13. The method of claim 1, wherein the current vehicle condition includes at least one of a transmission operating condition and an engine operating condition.

14. The method of claim 1, wherein the feedback indicator includes at least one of a visual feedback indicator, an auditory feedback indicator, and a tactile indicator.

15. The method of claim 1, wherein providing, with the human machine interface, the feedback indicator includes displaying the feedback indicator on a graphical user interface.

16. A system, comprising:
a vehicle including an internal combustion engine;
a controller in electrical communication with the internal combustion engine,
wherein the controller is structured to:
receive signals indicating conditions of the vehicle including an operator defined parameter, a fuel amount, a weather condition, a current vehicle condition, and a route condition;
determine one or more vehicle trip conditions based on at least one of the fuel amount, the weather condition, the route condition, the current vehicle condition, and the operator defined parameter;
determine to switch an operation mode based of the vehicle from an active control mode to a passive control mode or from the passive control mode to the active control mode on the one or more vehicle trip conditions and at least one of the fuel amount, the weather condition, the route condition, the current vehicle condition, and the operator defined parameter; and
control the vehicle to operate in the determined operation mode,
wherein the passive control mode includes:
determining an operator feedback commands based on at least one of the fuel amount, the weather condition, the route condition, the current vehicle condition, and the operator defined parameter,
providing the operator feedback command from the controller to a human machine interface (HMI), and
providing, with the human machine interface, a feedback indicator based on the operator feedback command,
wherein the active control mode includes:
determining a control command based on the one or more vehicle trip conditions and at least one of the fuel amount, the weather condition, the route condition, the current vehicle condition, and the operator defined parameter, and
providing the control command to an engine control unit for controlling at least one aspect of the vehicle based on the control command.

17. The system of claim 16, wherein the controller and the engine control unit are different devices.

18. The system of claim 16, wherein the controller and the engine control unit are integrated into a same device.

19. The system of claim 16, wherein the operator defined parameter further includes at least one of a fuel quantity buffer input, an allowable upper speed limit variance, an allowable lower speed limit variance, and a request route message.

20. The system of claim 16, wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill.

21. The system of claim 16, wherein the operator feedback command is provided in real time at any point along a vehicle route.

22. The system of claim 16, wherein the control command includes at least one of a transmission gear command, a cruise speed command, a torque curve command, and a throttle command.

23. The system of claim 16, wherein the controller is further structured to detect an off nominal condition, the off nominal condition including at least one of a brake being pressed by the operator, a severe, weather condition, a severe traffic condition, an engine derate condition, and a speed limit being below a speed limit threshold.

24. The system of claim 16, wherein the controller is structured to determine the operation mode based on an operator induced event, wherein the operator induced event includes at least one of a brake being pressed by the operator, a throttle position being greater than or equal to a throttle position threshold, and a throttle position rate being greater than or equal to a throttle position rate threshold.

25. The system of claim 16, wherein the feedback indicator includes at least one of a visual feedback indicator, an auditory feedback indicator, and a tactile indicator.

26. The system of claim 16, wherein the human machine interface is structured to display the feedback indicator on, a graphical user interface.

27. A method, comprising:
receiving operation conditions a cycle efficiency management (CEM) module;
determining, with the CEM module, one or more vehicle trip conditions based on the operation conditions;
determining, with the CEM module, to switch an operation mode of a vehicle from an active control mode to a passive control mode or from the passive control mode to die active control mode based on the one or more vehicle trip conditions and at least one of the operation conditions; and
controlling, with the CEM module, the vehicle to operate in the operation mode determined by the CEM module,
wherein controlling the vehicle in the passive control mode includes:
determining an operator feedback command based on at least one of the operation conditions,
providing the operator feedback command to a human machine interface, and
providing, with the human machine interface, a feedback indicator based on the operator feedback command,
wherein controlling the vehicle in the active control mode includes:
determining a control command based on the one or more vehicle trip conditions and at least one of the operation conditions; and
providing the control command to an engine control unit for controlling at least one aspect of the vehicle based on the control command.

28. The method of claim 27, wherein the received operation conditions include an operator defined parameter, a fuel amount, a weather condition, a current vehicle condition, and a route condition.

29. The method of claim 28, wherein the operator defined parameter further includes at least one of a fuel quantity buffer input, an allowable upper speed limit variance, an allowable lower speed limit variance, and a request route message.

30. The method of claim 28, wherein the route condition is indicative of at least one of a trip distance, an elevation profile, a route grade profile, a maximum speed limit, a minimum speed limit, a traffic condition, and a road condition.

31. The method of claim 27, wherein the operator feedback command includes at least one of an instantaneous fuel economy, an instantaneous operator income, an operator income selection, a fuel economy selection, a current engine torque curve output, a fuel quantity buffer output, a freight efficiency increase, an initial fuel quantity, a cruise speed set point, a gear set point, a throttle set point, a refueling stop location, a fuel quantity to refill, an available fuel quantity, and a distance to refill.

32. The method of claim 27, wherein the operator feedback command is provided in real time at any point along a vehicle route.

33. The method of claim 27, wherein controlling at least one aspect of the vehicle includes controlling at least one of a transmission, a cruise control setting, a torque provider, and a throttle.

34. The method of claim 27, wherein determining the operation mode is further based on an operator induced event, wherein the operator induced event includes at least one of a brake being pressed by the operator, a throttle position being greater than or equal to a throttle position threshold, and a throttle position rate being greater than or equal to a throttle position rate threshold.

35. The method of claim 27, wherein the feedback indicator includes at least one of a visual feedback indicator, an auditory feedback indicator, and a tactile indicator.

36. The method of claim 27, wherein the one or more vehicle trip conditions includes a coasting gear selection, a freight efficiency, and a fuel economy.

37. The method of claim 36, wherein the control command includes at least one of a transmission gear command, a cruise speed command, a torque curve command, and a throttle command.

38. The method of claim 27, wherein providing, with the human machine interface, the feedback indicator includes displaying the feedback indicator on a graphical user interface.

* * * * *